(12) United States Patent
Wang et al.

(10) Patent No.: US 12,307,595 B2
(45) Date of Patent: May 20, 2025

(54) AUTOMATIC CREATION OF THREE-DIMENSIONAL (3D) VARIABLE RESOLUTION REGION GEOMETRIES

(71) Applicant: Dassault Systemes Simulia Corp., Johnston, RI (US)

(72) Inventors: Huhu Wang, Dearborn, MI (US); Satheesh Kandasamy, Waltham, MA (US)

(73) Assignee: Dassault Systemes Americas Corp., Waltham, MA (US)

( * ) Notice: Subject to any disclaimer, the term of this patent is extended or adjusted under 35 U.S.C. 154(b) by 0 days.

(21) Appl. No.: 17/812,584

(22) Filed: Jul. 14, 2022

(65) Prior Publication Data

US 2024/0029353 A1   Jan. 25, 2024

(51) Int. Cl.

| | |
|---|---|
| *G06T 17/10* | (2006.01) |
| *G06T 15/06* | (2011.01) |
| *G06T 15/20* | (2011.01) |
| *G06T 17/20* | (2006.01) |
| *G06T 19/20* | (2011.01) |

(52) U.S. Cl.
CPC ............. *G06T 17/10* (2013.01); *G06T 15/06* (2013.01); *G06T 15/20* (2013.01); *G06T 17/20* (2013.01); *G06T 19/20* (2013.01); *G06T 2210/12* (2013.01); *G06T 2219/2016* (2013.01)

(58) Field of Classification Search
CPC ......... G06T 17/10; G06T 15/06; G06T 15/20; G06T 17/20; G06T 19/20; G06T 2210/12; G06T 2219/2016
See application file for complete search history.

(56) References Cited

U.S. PATENT DOCUMENTS

| | | | | |
|---|---|---|---|---|
| 4,778,271 | A | * 10/1988 | Kuwabara | ............ G01B 11/105 250/559.07 |
| 5,297,241 | A | * 3/1994 | Hirr, Jr. | .................. G06T 19/00 345/419 |
| 5,995,663 | A | 11/1999 | Itsuzaki | |

(Continued)

OTHER PUBLICATIONS

O'Rourke, Joseph. "Finding minimal enclosing boxes." International journal of computer & information sciences 14 (1985): 183-199. (Year: 1985).*

(Continued)

*Primary Examiner* — William A Beutel
(74) *Attorney, Agent, or Firm* — Sheehan Phinney Bass & Green PA

(57) ABSTRACT

A computer-implemented method is disclosed for creating three-dimensional (3D) variable resolution (VR) region geometries of a modeled object for use in a computer-implemented numerical simulation involving the modeled object. The computer-implemented method includes, inter alia, generating two-dimensional (2D) orthographic views of a 3D modeled object, and identifying edges of each of the 2D orthographic views with a computer-based ray casting method. The computer-based ray casting method includes, for each respective one of the 2D orthographic views, casting virtual rays from different directions toward the 2D orthographic view within a plane of the 2D orthograph view, and detecting an intersection point for each of the virtual rays with an edge of the 2D orthographic view.

28 Claims, 15 Drawing Sheets

(56) References Cited

U.S. PATENT DOCUMENTS

| | | | | |
|---|---|---|---|---|
| 2004/0096104 | A1* | 5/2004 | Terekhov | H04N 1/6058 |
| | | | | 358/518 |
| 2008/0089589 | A1 | 4/2008 | Lettenbauer | |
| 2015/0324951 | A1* | 11/2015 | Coon | G06T 3/40 |
| | | | | 345/420 |
| 2021/0321872 | A1* | 10/2021 | Saphier | G06T 17/20 |
| 2021/0390759 | A1* | 12/2021 | Muthler | G06T 17/10 |
| 2022/0114289 | A1* | 4/2022 | Te | G06N 3/045 |
| 2023/0066220 | A1* | 3/2023 | Coulombe | G06V 20/64 |

OTHER PUBLICATIONS

DS Simula; Powerflow 2020 User's Guide, 2020.

Markowsky et al; "Fleshing out Projections: Reconstructions of Objects, Part II;" Reprinted from IBM Journal Research and development; vol. 25, No. 6, Nov. 1981.

Markowsky et al; "Fleshing out Wire Frames: Reconstructions of Objects, Part I;" Reprinted from IBM Journal Research and development; vol. 24, No. 5, Sep. 1980.

Governi, et al; "3D Geometry Reconstruction from Orthographic Views: a Method Based on 3D Image Processing and Data Fitting." Computers in Industry, V64, Issue 9, pp. 1290-1300 (2013).

Dinesh Reddy, N., Vo, M., Narasimhan, S. G.: Carfusion: Combining Point Tracking and Part Detection for Dynamic 3D Reconstruction of Vehicles. In: Proceedings of the IEEE Conference on Computer Vision and Pattern Recognition, pp. 1906-1915 (2018).

Nozawa, N., Shum, H.P.H., Feng, Q. et al. 3D Car Shape Reconstruction from a Contour Sketch Using GAN and Lazy Learning. Vis Comput (2021).

Shewchuk J.R., Triangle: Engineering a 2D Quality Mesh Generator and Delaunay Triangulator. In: Lin M.C., Manocha D. (eds) Applied Computational Geometry Towards Geometric Engineering. WACG 1996. Lecture Notes in Computer Science, vol. 1148. Springer, Berlin, Heidelberg (1996).

Olsson, Martin: "Designing and Optimizing Side-View Mirrors", Master's Thesis in Automotive Engineering 2011, retrieved Dec. 2, 2023.

European Search Report for EP23185628 dated Dec. 13, 2023.

* cited by examiner

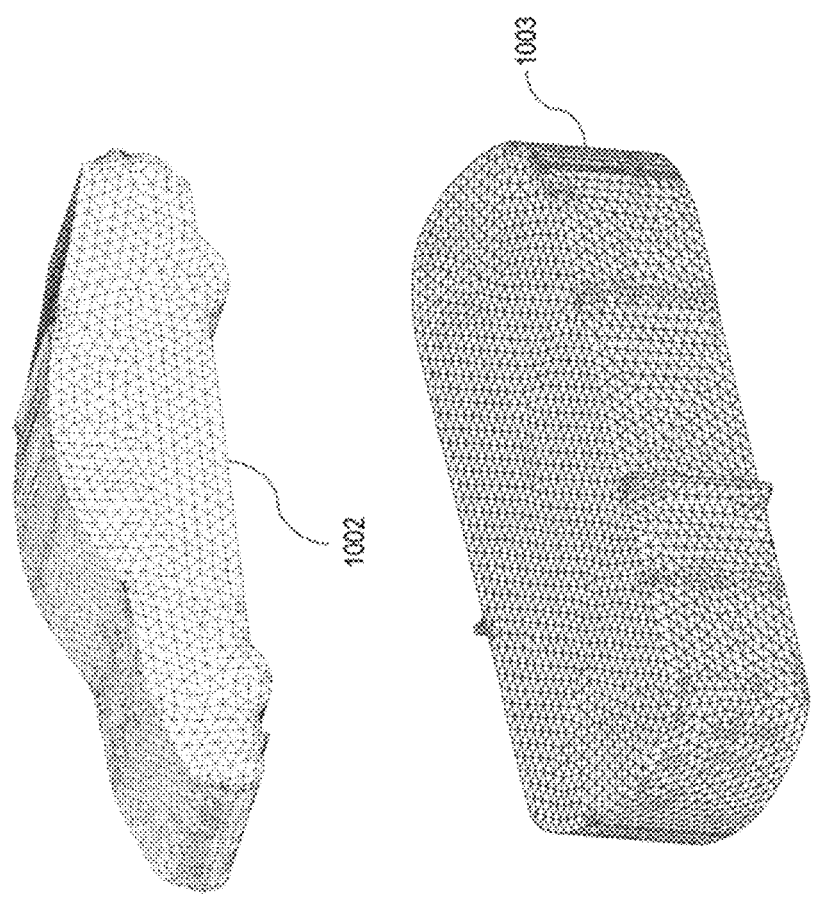
FIG. 12B
FIG. 12C
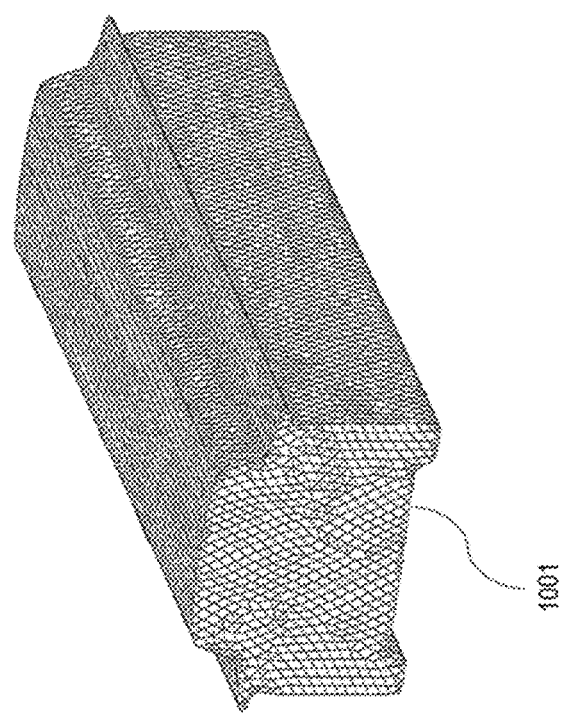
FIG. 12A

AUTOMATIC CREATION OF THREE-DIMENSIONAL (3D) VARIABLE RESOLUTION REGION GEOMETRIES

FIELD OF THE INVENTION

This disclosure relates to automatic creation of three-dimensional (3D) variable resolution region geometries and, more particularly, relates to automatic creation of three-dimensional (3D) car-shaped variable resolution region geometries from orthographic view images for numerical simulation process automation.

BACKGROUND

In a numeric simulation, to optimize computational resources, varied meshing sizes are often applied in different fluid regions. These regions are also known as variable resolution (VR) regions whose sizes are defined by separate referencing geometries. Specifically, for a Lattice-Boltzmann Method (LBM) based simulation, VR regions have varied lattice refinement sizes among different levels.

SUMMARY OF THE INVENTION

In one aspect, a computer-implemented method is disclosed for creating three-dimensional (3D) variable resolution (VR) region geometries of a modeled object for use in a computer-implemented numerical simulation involving the modeled object. The computer-implemented method includes generating two-dimensional (2D) orthographic views of a 3D modeled object, identifying edges of each of the 2D orthographic views with a computer-based ray casting method that comprises, for each respective one of the 2D orthographic views: casting virtual rays from different directions toward the 2D orthographic view within a plane of the 2D orthograph view, and detecting an intersection point for each of the virtual rays with an edge of the 2D orthographic view.

In some implementations, the method includes calculating bounding box dimensions for the 3D modeled object, wherein the bounding box dimensions define a size of the smallest possible box that would completely contain the 3D modeled object. Calculating the bounding box dimensions may involve defining a bounding box (based on its surfaces). The bounding box surfaces may include a front surface that contacts a frontmost point of the 3D modeled object, a rear surface that contacts a rearmost point of the 3D modeled object, side surfaces that respectively contact furthest points on either side of the 3D modeled object, a bottom surface that contacts the lowest point of the 3D modeled object, and a top surface that contacts a highest point on the 3D modeled object. The front surface is parallel to the rear surface, the bottom surface is parallel to the top surface, and each of the side surfaces is parallel to the other side surface. The bounding box dimensions may be calculated (or identified), by a computer processor, based on relative locations of the bounding box surfaces.

In a typical implementation, the method includes calculating, with a computer processor, a geo-pixel mapping ratio to represent a mapping relationship between pixels in one or more of the 2D orthographic views and a corresponding distance represented in the 3D modeled object. Calculating the geo-pixel mapping ratio may include, for example, calculating a distance in the 3D modeled object that corresponds to a space between adjacent pixels based on the bounding box dimensions and a number of pixels applied to that distance for each respective one of the 2D orthographic views.

In certain implementation, the method further includes converting a pixel list for one or more of the 2D orthographic views to a geometry point list based on the calculated geo-pixel mapping ratio. Each entry in the geometry point list may include a set of coordinate values that identifies a location on the 3D modeled object for an associated one of the listed geometry points.

According to some implementations, the 3D modeled object is a 3D modeled car with tires, a hood, etc. In some such implementations, the method further includes calculating a height of the hood of the 3D modeled car. Calculating the hood height may include: sorting the geometry point list to identify two lowest geometry points in a vertical direction based on their respective coordinate values, identifying a forwardmost one of the two lowest geometry points in the vertical direction based on their respective coordinate values to identify a coordinates value that corresponds to a lowest point of a front tire of the 3D modeled car, casting a virtual ray from the lowest point of the front tire of the 3D modeled car in a vertically upward direction, intersecting a point on the 3D modeled car vertically above the lowest point of the front tire of the 3D modeled car with the cast ray; identifying a length of the cast ray from the lowest point of the front tire to the point of intersection vertically above the lowest point of the front tire as a hood height for the 3D modeled car. In implementations where the 3D modeled object is a 3D modeled car, the method may further include identifying a rearmost one of the two lowest geometry points in the vertical direction based on their respective coordinate values to identify the lowest point of a rear tire of the 3D modeled car.

In a typical implementation, the method further includes translating and scaling the points from the geometry point list for each respective one of multiple views of the modeled car based on distance requirements, stored in computer memory, for each of the VR region geometries.

In some implementations, the method further includes generating 2D surface meshes that correspond to each respective one of the 2D orthographic views. Generating the 2D surface meshes may include generating the 2D surface meshes with a 2D triangle mesh generator based on the translated and scaled points from the geometry point list for each respective one of the multiple views of the modeled car.

In a typical implementation, the method includes calculating bounding box dimensions for and based on the 2D surface meshes.

In a typical implementation, the system includes constructing intermediate 3D meshes from the 2D surface meshes. Constructing the intermediate 3D meshes from the 2D surface meshes may include, for each of the 2D surface meshes, orienting selected facets of the 2D surface mesh so that a negative side of all facets is facing toward an interior of the modeled car, duplicating the 2D surface mesh to produce a duplicated 2D surface mesh and extruding the 2D surface mesh or the duplicated 2D surface mesh. Each extrusion may be performed in a direction normal to a surface of the 2D surface mesh or the duplicated 2D surface mesh to produce an extruded mesh and may cover a distance that is based on dimensions of the VR region geometries.

In a typical implementation, a computer intersects the intermediate 3D meshes to produce a final 3D mesh having the 3D VR region geometry. The resulting final 3D mesh having the 3D VR geometry may be used in a computer-implemented simulation to analyze performance or behavior of the 3D modeled car to confirm expectations and/or guide further iterations in design of the 3D modeled car. Moreover, a real-world version of the 3D modeled car (i.e., a real-world car) may be manufactured based on a final car design that has been exposed to the computer-based simulation.

In another aspect, a computer system is disclosed for creating three-dimensional (3D) variable resolution (VR) region geometries of a modeled object for use in a computer-implemented numerical simulation involving the modeled object. The computer system includes a computer processor and computer-based memory operatively coupled to the computer processor, wherein the computer-based memory stores computer-readable instructions that, when executed by the computer processor, cause the computer-based system to: generate two-dimensional (2D) orthographic views of a 3D modeled object, identify edges of each of the 2D orthographic views with a computer-based ray casting method. The computer-based ray casting method includes, for each respective one of the 2D orthographic views, casting virtual rays from different directions toward the 2D orthographic view within a plane of the 2D orthograph view, and detecting an intersection point for each of the virtual rays with an edge of the 2D orthographic view.

In yet another aspect, a non-transitory computer readable medium is disclosed having stored thereon computer-readable instructions that, when executed by a computer-based processor, cause the computer-based processor to generate two-dimensional (2D) orthographic views of a 3D modeled object, identify edges of each of the 2D orthographic views with a computer-based ray casting method. The computer-based ray casting method includes, for each respective one of the 2D orthographic views, casting virtual rays from different directions toward the 2D orthographic view within a plane of the 2D orthograph view, and detecting an intersection point for each of the virtual rays with an edge of the 2D orthographic view.

In some implementations, one or more of the following advantages are present.

For example, certain implementations facilitate the automatic creation of three-dimensional (3D) variable resolution region geometries that may be utilized in one or more computer-implemented simulations. More particularly, certain implementations facilitate the automatic creation of three-dimensional (3D) car-shaped variable resolution region geometries from orthographic view images for numerical simulation process automation.

Implementations of the system and techniques disclosed herein may be performed automatically and quickly, thus providing an improvement over existing solutions, which tend to be time-consuming and involve manual processes. For example, the systems and techniques disclosed herein can create VR6 and VR7 within minutes while existing manual solutions may take hours or days. Additionally, implementations of the systems and techniques disclosed herein extract vehicle edge information using ray casting which is faster than using traditional edge detectors. Moreover, implementations of the systems and techniques disclosed herein scale the 2D points uniformly and non-uniformly to meet strict distance requirements between the vehicle model and the VR region referencing geometry, whereas pre-existing solutions fall short on these goals. Additionally, implementations of the systems and techniques disclosed herein utilize a new, simple (thus, fast), and reliable method to reconstruct the 3D mesh. The pre-existing methods are complex and involve either model training or trying to resolve all the vehicle details present in the input 2D images which are either the car model images or sketch images. Implementations of the systems and techniques disclosed herein automatically customizes the resulting 3D mesh so that it fits the numerical simulation purpose better whereas in the pre-existing manual processes the selection of the cutting pivot point is usually subjective, resulting in errors.

Other features and advantages will be apparent from the description and drawings, and from the claims.

BRIEF DESCRIPTION OF THE DRAWINGS

FIG. 12A is a perspective view of an intermediate 3D mesh created from a corresponding 2D mesh of a front view of a modeled car.

FIG. 12B is a perspective view of an intermediate 3D mesh created from a corresponding 2D mesh of a side view of the modeled car.

FIG. 12C is a perspective view of an intermediate 3D mesh created from a corresponding 2D mesh of a top view of the modeled car.

Like reference characters refer to like elements.

DETAILED DESCRIPTION

Figure 1A:
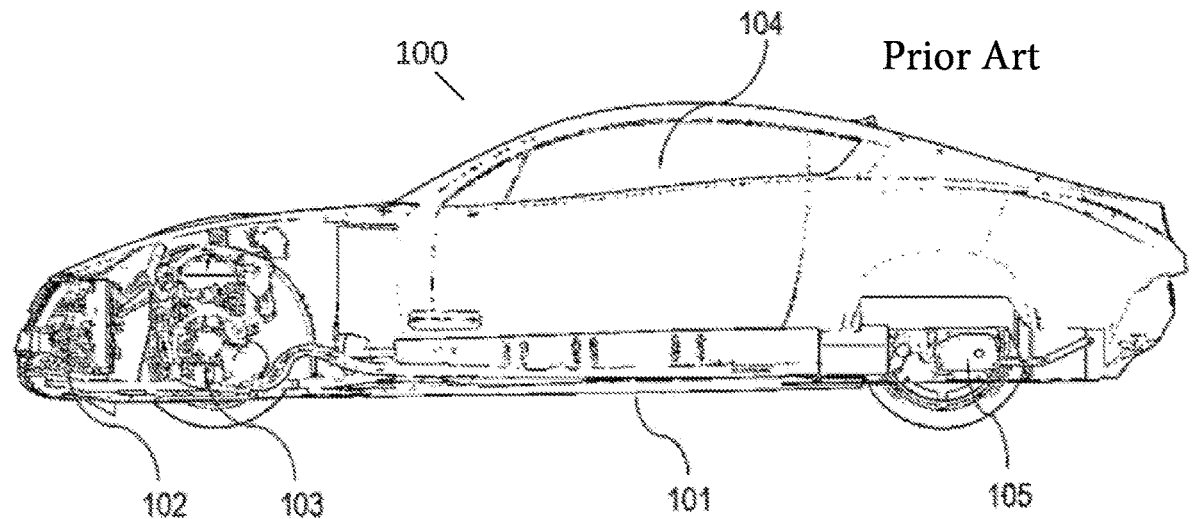
FIG. 1A shows sectional side view of a watertight wrap of a computer-implemented 3D car model.

This document uses a variety of terminology to describe the inventive concepts set forth herein. Unless otherwise indicated, the following terminology, and variations thereof, should be understood as having meanings that are consistent with what follows.

"Numerical simulation" refers to processes performed by a computer to simulate real-world processes or systems by performing calculations based on mathematical models of the real-world processes or systems.

A "mesh" is network of cells and nodes that support certain numerical simulations in a computer-implemented environment. Typically, each cell in a mesh would represent an individual solution to the simulation and the various individual solutions may be combined to produce an overall solution for the entire mesh.

"Resolution" refers to the density or size of cells (e.g., mesh size) or finite elements represented, for example, in a mesh generated by a computer to support a computer-implemented numerical simulation based on a computer-implemented model of an object or a portion thereof. Resolution can influence efficiency and effectiveness of a computer-implemented simulation. For example, high resolution simulations can produce detailed data but are costly, whereas low resolution simulations tend to be less expensive but produce less detailed data. Utilizing variable resolution ("VR") regions is one way to try to strike a balance between the two.

A "Variable resolution region" (or "VR region") is a region (e.g., a flow region) defined in and/or around a modeled object (e.g., a car) in a computer-implemented simulation involving the modeled object (e.g., car), where the resolution of meshes for the simulation vary from one VR region to another VR region. Complex simulations, such as those involving the Lattice-Boltzmann method for example, may assign multiple (e.g., up to eleven or twelve) different regions for meshes in a simulation involving a modeled car. Some of those regions, which are designated VR6 and VR7 herein, are outside the modeled car, with the VR7 region (e.g., having a uniform 3 millimeter mesh size) being closest to the major outer surfaces of the modeled car and VR6 (e.g., having a uniform 6 millimeter mesh size) being immediately outside VR7.

"Referencing geometry," as used herein, refers to the overall shape (or geometry) that a particular VR region and its meshes follow. In a typical implementation, the referencing geometries for variable regions VR6 and VR7 will follow the contours of the underlying object (e.g., car), subject to certain, sometimes strict, positioning/distance restrictions (typically, non-uniform) relative to various surfaces of the car.

The phrase "orthographic images" or "orthographic views" refers to images of an object (e.g., car) taken from different perspectives, typically perpendicular to one another (e.g., a front view, a side view, and a top view).

"Automatically" refers generally to something happening within a computer without requiring a specific prompt from a human user. A computer-implemented process may include one or more steps that are considered to be automatic as long as those steps are performed by the computer without specific prompting from the human user (e.g., as part of a process that the computer performs on its own) —this is so even if the overall process may be initiated by the human user.

Other Approaches

Figure 1B:
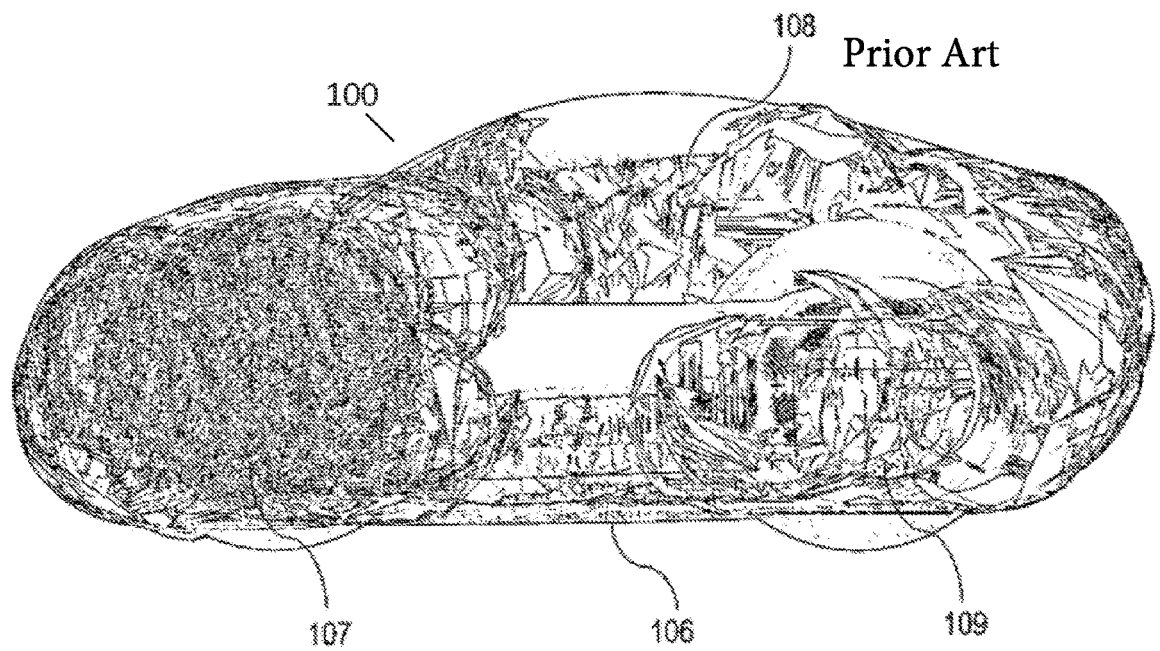
FIG. 1B shows an offset model from the wrap which is not suitable for VR region definition.

One method of creating an enlarged 3D car geometry with control over the shape of the enlarged geometry (e.g., that may serve to define a VR region) is to offset a watertight wrap of the 3D car model. FIG. 1A presents a sectional side view of a 3D car mesh model 100 and a watertight wrap 101 of the 3D car mesh model. FIG. 1B presents a sectional side view of the 3D car mesh model 100 and its offset model 106 with a uniform offset distance of 10% of its length. Depending on the specific car models and presence of any relatively large openings or gaps, a watertight wrap (e.g., 101) may enter into the interior region of the car, such as the engine compartment 102 and 103, cabin 104, and/or exhaust area 105. The consequence of offsetting such a mesh with a relatively large distance which may be needed for VR creation is that the resulting meshes in those regions will have very poor quality as shown in FIG. 1B. Thus, using this approach, the generated model may not be considered suitable for defining VR regions due to the problematic meshes created in areas such as the car's under hood region 107 (due to openings or gaps at the engine compartment 102 and 103), cabin 108 (due to openings or gaps at the cabin 104), and/or exhaust region 109 (due to openings or gaps at exhaust area 105). Although it is possible to seal the car model manually before performing the wrap operation to prevent any leakage when wrapping, the offset method will still create a mesh model with poor quality when the offset distance is relatively large. This is because a car usually has an aerodynamic shape which means the surface of a car is never flat, and any structural protrusions, such as steep curvatures, rear spoilers, antennas, and/or roof spoilers could result in sharp extrusions from the mesh surface during the offsetting process.

In various implementations, the systems and techniques disclosed herein provide a technical solution to these (and other technical problems).

Technical Disclosure

In computer-implemented numerical simulation, a computer simulates real-world processes or systems by performing calculations based on a computer-implemented mathematical model of the real-world processes or systems. Computer-based simulations may involve discretizing (e.g., physical space or time) represented in the mathematical model with a mesh that includes a network of cells. In such implementations, the calculations for the computer-implemented numerical simulation may be performed on a per cell basis an overall conclusions of the computer-implemented numerical simulation may be derived from the collection of per cell calculation results.

In some implementations, a computer-implemented simulation may involve multiple meshes discretizing different physical spaces relative to the process or system being modeled. The size, shape, and resolution of each mesh can vary depending on the aims of the associated numerical simulation(s). In general, the use of a higher resolution mesh tends to produce a lot of detail at the expense of lower efficiently, whereas the use of a lower resolution mesh tends to produce less detail with higher efficiency. The resolution (e.g., cell size) in a computer-implementation numerical simulation can vary from mesh to mesh or within the same mesh. In general, this variance can be done in an attempt to balance the interests of producing detailed output as efficiently as practical. In computer-implemented numerical simulations, regions of varying mesh/cell sizing (resolution) may be referred to as variable resolution ("VR") regions.

There are a variety of ways to perform computer-implemented simulations. Some simulations use a discrete particle approach to simulate fluid flow, for example. Such approaches are generally stable by their nature, reproduce continuum fluid dynamics in the mean, and mimic microphysical processes in a discrete manner rather than using differential equation methods. Some such methods may be based on Lattice Boltzmann methods (LBM), where particles may exist at discrete locations in space, moving in discrete directions with discrete speeds at discrete intervals of time. In certain implementations of simulation methods based on LBM, VR regions have varied lattice refinement sizes (e.g., cell sizes) among different levels.

For vehicle simulations using LBM, for example, there may be numerous (e.g., up to 11, 12 or more levels) of VR regions present depending on the specific application of interest in the simulation (e.g., aerodynamics, thermal management, and aeroacoustics). A higher VR level generally has a finer mesh applied in that VR region, and a lower VR level generally has a coarser mesh applied in that VR region. Since computational cost is highly correlated to the sizes of the geometries defining each VR region, it may be considered computationally inefficient to use cuboids for fine VR regions. Thus, best practices with optimized VR region shapes are usually developed and applied.

In an exemplary implementation of a computer-implemented simulation involving a vehicle, multiple VR levels may be generated to simulate a characteristic of interest in different physical locations in and around the vehicle. Each such VR region may be designated, for example, numerically (e.g., VR1 to VR11). In one such simulation, certain VR regions (e.g., VR8 to VR11) may enclose internal components of the vehicle (e.g., cooling fan, heat exchangers, engine, etc.) In VR regions that enclose internal components of a vehicle, a normal offset with optimized enlarging factors of those parts may be adequate. However, in exterior VR regions (e.g., regions outside the vehicle), including those closest to the vehicle body (e.g., VR6 and VR7), there may be certain requirements, for example, to minimize computational cost and VR transitional effects (e.g., any flow structure changes near the boundary of two adjacent VR regions). (See, e.g., the 2022 PowerFLOW User's Guide, Dassault Systemes SIMULIA Corp.). For example, these two VR regions (VR6 and VR7) may need to be car-shaped so that the VR boundaries will be approximately parallel to the flow streams along the vehicle as the vehicle is moving. Additionally, in a typical implementation for one or more applications, VR7 should have a uniform distance along each direction (horizontal, vertical, and lateral), respectively, from the car body. However, the distance between region VR6 and the vehicle body may be non-uniform due to the fact that this larger VR (VR6) may need to enclose the rear wake region meaning that the rear portion of this VR (VR6) will be further away from the vehicle body. Moreover, to better resolve the flow near the front bumper area of the vehicle with optimized computational efficiency, the distance between the VR6 region and the vehicle front bumper may be a function of the height of the vehicle hood. Moreover, the distance requirement may not only be required along the vehicle moving direction but also on the vertical and lateral directions. The distances between VR6 and the vehicle along these two directions may need to be functions of vehicle height and width, respectively.

Although VR region referencing geometries do not need to have all the details of a vehicle's exterior shape nor do they generally need to have a class-A mesh quality, with the restricted requirements described above, it is generally not feasible to create these two VRs (VR6 and VR7) with just a simple offset operation applied on the vehicle model. In addition, offsetting the whole vehicle model usually does not work well especially when the offset size is large because of the complex details that the vehicle model may have. This drawback hinders process automation that is based on offset. Admittedly, these two VR region geometries could be created manually by creating controlling lattices around a water-tight copy of the vehicle model and then precisely adjusting these lattice locations to meet all distance requirements. However, this manual process could take from hours to days depending on the geometry tools that the engineers are using and also on their skill levels.

One way to automate this process would be to reconstruct the required 3D geometry from images of the vehicle. Research have been conducted by reconstructing the whole vehicle model from images of the vehicle using machine learning methods. (See, e.g., Nozawa, N., Shum, H. P. H., Feng, Q. et al. *3D Car Shape Reconstruction from a Contour Sketch Using GAN and Lazy Learning*, Vis Comput. (2021); and Dinesh Reddy, N., Vo, M., Narasimhan, S. G.: *Carfusion: Combining Point Tracking and Part Detection for Dynamic 3D Reconstruction of Vehicles*. In: Proceedings of the IEEE Conference on Computer Vision and Pattern Recognition, pp 1906-1915 (2018).) However, these methods usually require a large set of data to train their neural network models and cannot guarantee to capture the vehicle features all the time accurately. These methods tend to be more suitable for qualitative visualization of the vehicle models for early design or for autonomous driving purpose but not for creating mesh models with precise requirements.

There are also other methods that have been developed to utilize 2D images from geometry sketches (see, e.g., *3D Geometry Reconstruction from Orthographic Views: A Method Based on 3D Image Processing and Data Fitting*, Computers in Industry, V64, Issue 9, pp 1290-1300 (2013); and G. Markowsky, M. A. Wesley, *Fleshing out wireframes*, IBM Journal of Research and Development 24 (5) (1980) 582-597) or projections (see, e.g., M. A. Wesley, G. Markowsky, *Fleshing out projections*, IBM Journal of Research and Development 25 (6) (1981) 934-954) to reconstruct 3D geometries. Although the obtained geometries can be more accurate compared to the ones using machine learning methods as those methods analyze detailed feature edges and lines (both solid and dash) in a 2D image to retrieve all the depth information, the process can be overkill for VR region geometries which do not require all the details of a car model as it just defines a fluid domain in which the mesh size differs from other VR regions. In addition, these methods do not generally include a uniform or non-uniform scaling process that may be required for VR region referencing geometry.

Figure 2:
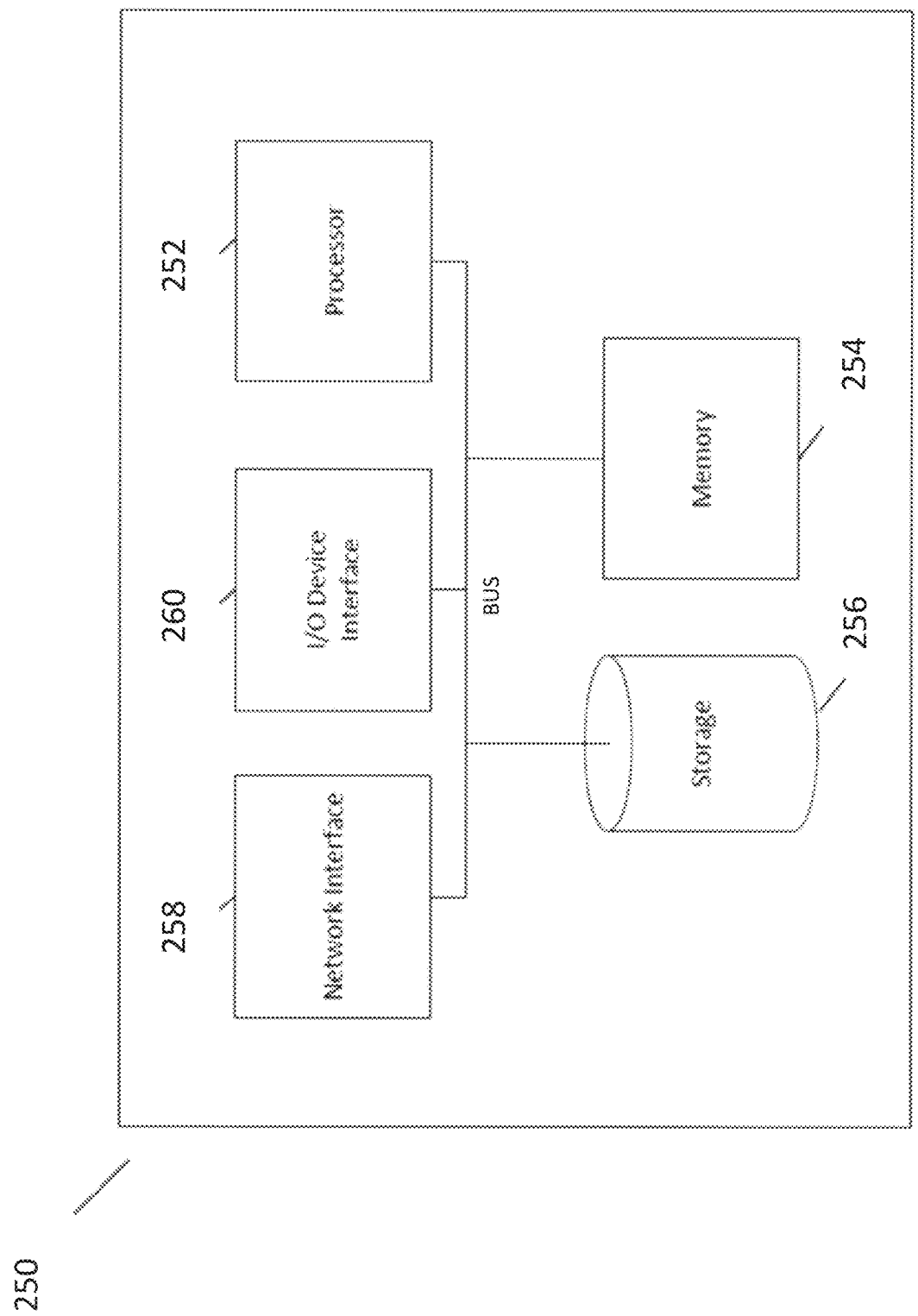
FIG. 2 is a schematic representation of a computer configured to automatically create three-dimensional (3D) variable resolution (VR) region geometries.

FIG. 2 is a schematic representation of an exemplary implementation of a computer 250 configured to automatically create three-dimensional (3D) variable resolution region geometries (e.g., three-dimensional (3D) car-shaped variable resolution region geometries from orthographic view images for numerical simulation process automation).

The illustrated computer 250 has a processor 252, computer-based memory 254, computer-based storage 256, a network interface 258, an input/output device interface 260, and an internal bus that serves as an interconnect between the components of the computer 250. The bus acts as a communication medium over which the various components of the computer 250 can communicate and interact with one another.

The processor 252 is configured to perform the various computer-based functionalities disclosed herein as well as other supporting functionalities not explicitly disclosed herein. In some implementations, some of the computer-based functionalities that the processor 252 performs include those functionalities disclosed herein as being attributable to the computer 250. In some implementations, the processor 252 performs these and other functionalities by executing computer-readable instructions stored on a computer-readable medium (e.g., memory 254 and/or storage 256). In various implementations, some of the processor functionalities may be performed with reference to data stored in one or more of these computer-readable media and/or received from some external source (e.g., from an I/O device through the I/O device interface 260 and/or from an external network via the network interface 258).

The processor 252 in the illustrated implementation is represented as a single hardware component at a single node. In various implementations, however, the processor 252 may be distributed across multiple hardware components at different physical and network locations.

The computer 250 has both volatile and non-volatile memory/storage capabilities.

In the illustrated implementation, memory 254 provides volatile storage capabilities. In a typical implementation, memory 254 serves as a computer-readable medium storing computer-readable instructions that, when executed by the processor 252, cause the processor 252 to perform one or more of the computer-based functionalities disclosed herein. More specifically, in some implementations, memory 254 stores computer software that enables the computer to automatically create three-dimensional (3D) variable resolution region geometries in accordance with the systems and computer-based functionalities disclosed herein.

In some implementations, the computer software may be integrated into, or be designed to be utilized in connection with, a software program (stored in memory 254) that facilitates computer-based simulations that utilize the VR region geometries created by the computer software. For example, in certain implementations, the computer software may be integrated into PowerFLOW® simulation software available from Dassault Systemes Simulia Corp.

PowerFLOW® simulation software provides unique solutions for computational simulation of fluid-flow problems. It is suitable for a wide range of applications, whether simulating transient or steady-state flows. Using an enhanced particle-based method based on DIGITALPHYSICS® technology, PowerFLOW offers a wide range of modeling and analysis capabilities, including aerodynamics simulations, thermal simulations (including, e.g., convection, conduction, radiation, and heat exchangers), and aeroacoustics simulations. PowerFLOW® simulation software is able to simulate fluid-flow design problems in such industries as automotive and other ground transportation, aerospace, petroleum, building design and architecture/engineering/construction (AEC), heating, ventilating, and air conditioning (HVAC), and electronics. Automotive applications include, for example, full car external aerodynamics for drag and lift, underbody design, noise source identification or aeroacoustics for side mirror, antenna, glass offset and detail design, wind tunnel design and validation, intake ports, manifolds, heating, and air conditioning ducts, under hood cooling, filter design, and windshield wiper design, etc.

A program such as PowerFLOW® simulation software, for example, adapted to incorporate the techniques disclosed herein, would have the ability, when executed by computer, to automatically create three-dimensional (3D) variable resolution region geometries in accordance with the disclosures contained herein.

Figure 3:
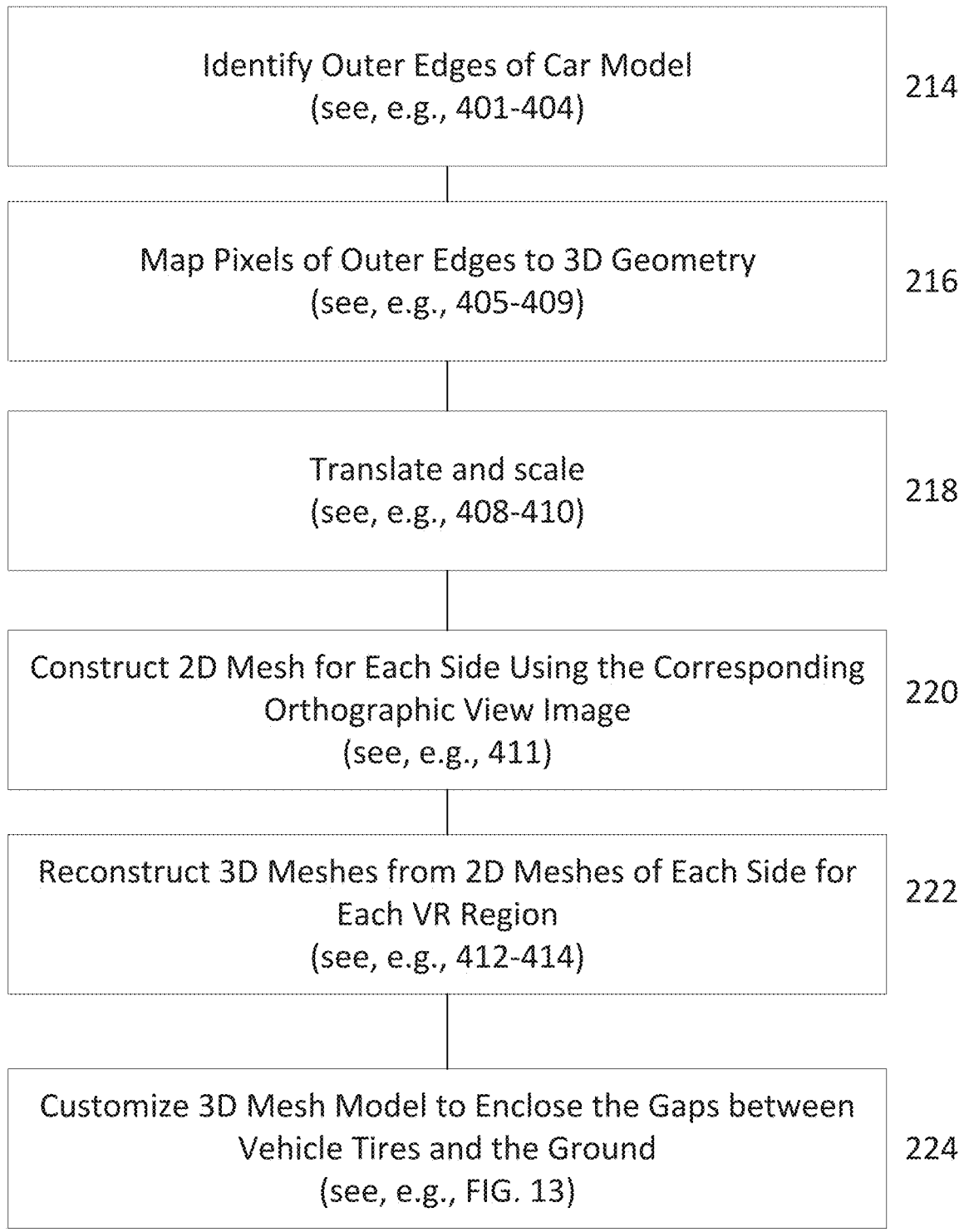
FIG. 3 is a high-level flowchart showing an implementation of a process to create three-dimensional (3D) variable resolution region geometries.

FIG. 3 is a flowchart of a high level representation of a method (that may be performed by computer 200, for example) of automatically creating three-dimensional (3D) car-shaped variable resolution region geometries from orthographic view images of a car for numerical simulation process automation. These steps are explained below in further detail. The process represented in the illustrated flowchart (at 214) includes identifying outer edges of the car model. In a typical implementation, the process utilizes ray casting to extract the outer edges of the car model from the three orthographic view images. In a typical implementation, this edge identification may be performed without the use of edge detectors. Edge detectors typically implement an image processing technique to find all "boundaries" in an image. These boundaries may be found, for example, by checking the rgb (red green blue)/color gradients/changes. Edge detectors typically require pre-processing of an image to make it suitable for gradient computation. For example, for an image with a cat in it, the color of its eyes will be different from its face. Its body's color will generally be different from its surroundings. Edge detectors will find all "edges" inside an image. The systems and techniques disclosed herein do not need all "edges" of the object of interest in an image but only the outer boundary of the object. In addition, no pre-processing step is needed which improves computational efficiency.

Next, the process represented in the illustrated flowchart (at 216) includes mapping pixels of the outer edges to three-dimensional (3D) geometry. In a typical implementation, this involves establishing a mapping relationship (e.g., between real three-dimensional (3D) physical dimensions of the modeled car and a pixel representation of the car model). Key dimensions may be measured in the 3D car model to help ensure that the mapping relationship is accurate between the real physical geometry information and the pixel information present in the images.

Next, the process represented in the illustrated flowchart (at 218) includes a step of translating and scaling. This may entail performing uniform and non-uniform scaling of two dimensional (2D) points obtained from the images for each side. Moreover, the uniform and non-uniform scaling may follow input requirements for creating VR region referencing geometries.

Next, the process represented in the illustrated flowchart (at 220) includes constructing a 2D mesh for each side of the car using corresponding orthographic view images of the car. In some instances, this may involve resampling of 2D points to optimize the performance and accuracy of the process.

Next, the process represented in the illustrated flowchart includes reconstructing (at 222) the 3D meshes from the 2D meshes of each side for each VR region. This may involve, for example, intersecting three intermediate 3D mesh models created from 2D surface meshes. Next, the process represented in the illustrated flowchart includes customizing (at 224) the 3D mesh model to enclose any gaps between the car tires and the ground. In some implementations, this may involve calculating a pivot point for performing a Boolean operation in order to cut a lower portion of the 3D model and then extruding the resulted mesh all the way to the ground where the vehicle is located.

Figure 4A:
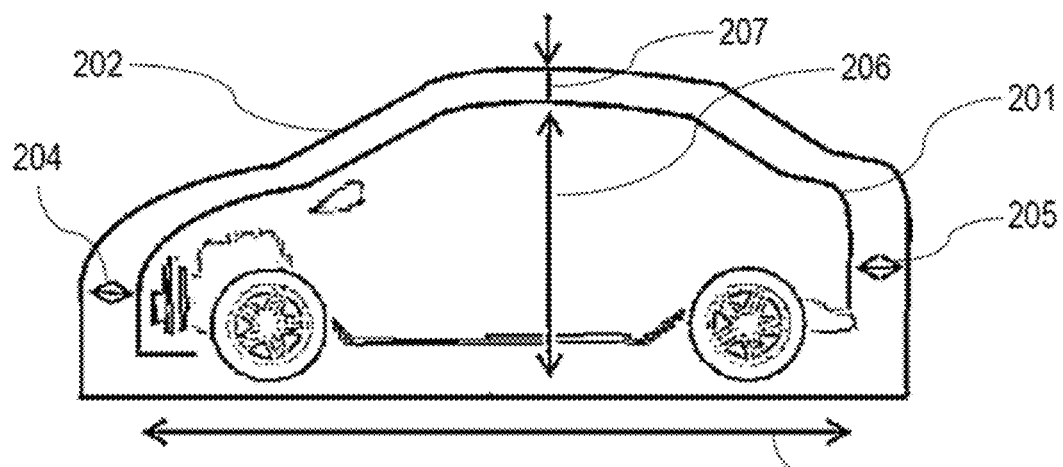
FIG. 4A is a side view representation of an implementation of a VR7 region and corresponding dimension indicators for a modeled car.

FIG. 4A is a side view of a computer-implemented model 201 of a vehicle, which in the illustrated implementation is a car, and a virtual boundary 202 surrounding the vehicle that represents one of potentially multiple variable regions (e.g., VR7) that may be generated by computer 200 to support a computer-implemented simulation based of the car represented by the model 201.

Figure 4B:
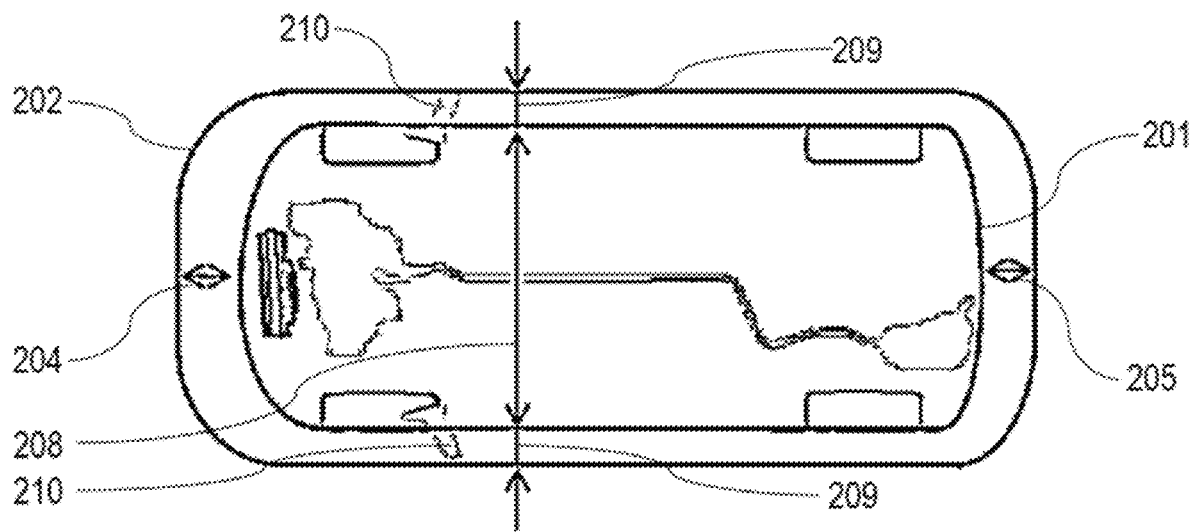
FIG. 4B is a top view of the VR7 region in FIG. 4A.

FIG. 4B is a top view of the computer-implemented model 201 and the virtual boundary 202 representing VR7.

The car in represented in the illustrated model 201 has a length 203, width 208, height 206. The length 203 represents the maximum distance of the car from the front of the car to the rear of the car. The width 208 represents the maximum distance of the car from side to side, excluding the side view mirrors 210. The height 206 of the car represents the maximum distance of the car from the bottom of the tires to the top of the car, excluding antennas.

In a typical implementation, the variable region VR7 identified by virtual boundary 202 in the illustrated implementation is the variable region that is closest to the body of the car. The position and configuration of variable region VR7, as represented by virtual boundary 202, may be subject to a variety of restrictions relative to the body of the car. These restrictions, which may be stored in memory 254 for example, can define the overall shape of the variable region VR7 and its virtual boundary 202 including: a frontal distance 204 (i.e., the horizontal distance between the front of the car and the forwardmost portion of the virtual boundary 202), a rear distance 205 (i.e., the horizontal distance between the rear of the car and the rearmost portion of the virtual boundary 202, side distances 209 (i.e., the horizontal distances between each side surface of the car and the corresponding side of the virtual boundary 202), and a top distance 207 (i.e., the vertical distance between the highest point of the car and a corresponding point on the virtual boundary 202 directly above that highest point).

The restrictions on position and configuration of the VR7 virtual boundary 202 can vary. The VR7 virtual boundary 202, as reflected in the illustrated implementation, is approximately car-shaped and surrounds, with a space between, the outer surface of the modeled car. Moreover, in an exemplary implementation, the front distance 204 and rear distance 205 have the same value and that value is a function of the vehicle length 203. Similarly, the top distance 207 is a function of vehicle height 206. Likewise, each side distance 209 is a function of the vehicle width 208. At the sides of the vehicle, the VR7 virtual boundary should (and does in the illustrated implementation) enclose the side view mirrors 210.

Figure 5A:
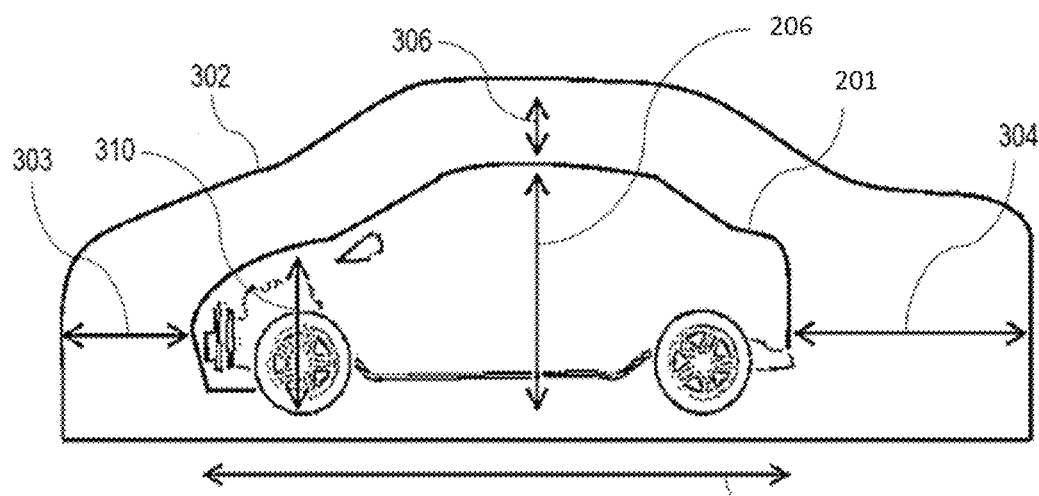
FIG. 5A is a side view representation of an implementation of a VR6 region and corresponding dimension indicators for a modeled car.
Figure 5B:
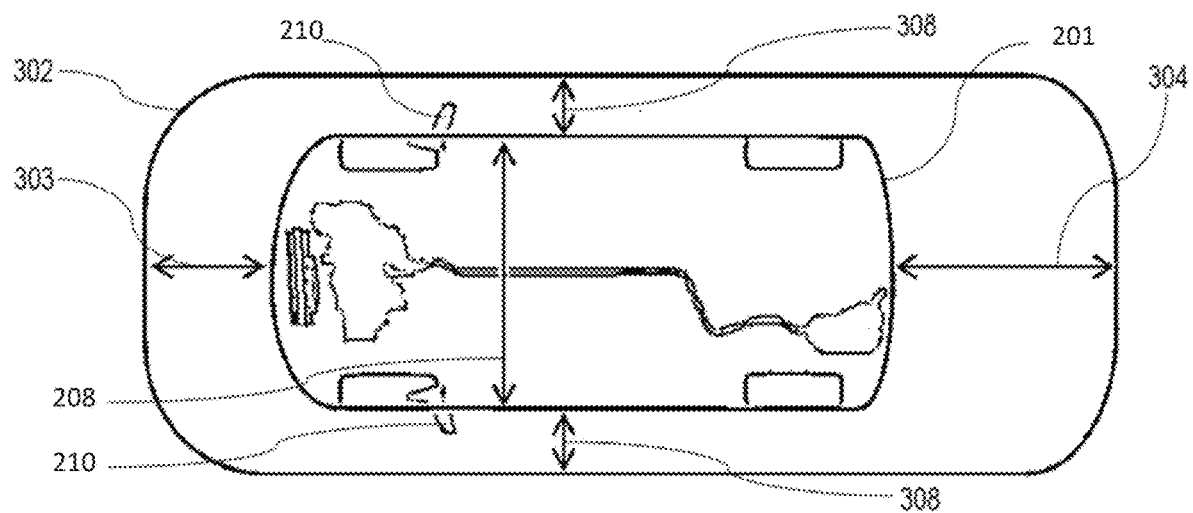
FIG. 5B is a top view of the VR6 region in FIG. 5A.

FIGS. 5A and 5B show another outer VR region that is larger than and encloses both VR7 and the car model 201. This larger outer VR region is called VR6 and is represented by virtual boundary 302.

The position and configuration of variable region VR6, as represented by virtual boundary 302, may be subject to a variety of restrictions relative to the body of the car. These restrictions, which may be stored in memory 254 for example, can define the overall shape of the variable region VR6 and its virtual boundary 302 including: a frontal distance 303 (i.e., the horizontal distance between the front of the car and the forwardmost portion of the virtual boundary 302), a rear distance 304 (i.e., the horizontal distance between the rear of the car and the rearmost portion of the virtual boundary 302, side distances 308 (i.e., the horizontal distances between each side surface of the car and the corresponding side of the virtual boundary 302), and a top distance 306 (i.e., the vertical distance between the highest point of the car and a corresponding point on the virtual boundary 302 directly above that highest point).

The restrictions on position and configuration of the VR6 virtual boundary 302 can vary. The VR6 virtual boundary 302, as reflected in the illustrated implementation, is approximately car-shaped and is larger than both VR7 and the outer surface of the modeled car 301. Moreover, in an exemplary implementation, the top distance 306 and the side distance 308 are still functions of vehicle height 305 and width 307, respectively. Compared to VR7, these two distances 306 and 308 are larger. The frontal distance 303 is a function of vehicle hood height 310 which is defined by the vertical distance between the lowest point of the front wheel and the hood (e.g., a position on the hood directly above a line connecting the lowest points of the two front wheels). The rear distance 304 is longer than the front distance 303 to account for the vehicle rear wake area when the car is moving on the road. The rear distance 304 is a function of the vehicle height 305. These distance requirements may be required to maximize computational savings while reducing interference to flow structures. However, they poses challenges in creating these geometries, particularly in an efficient and automated way.

In a typical implementation, the systems and techniques disclosed herein facilitate automatic generation of variable region geometries, such as those represented in FIGS. 4A and 4B (VR7) and those represented in FIGS. 5A and 5B (VR6) to support simulations involving the modeled vehicle 201.

Figure 6:
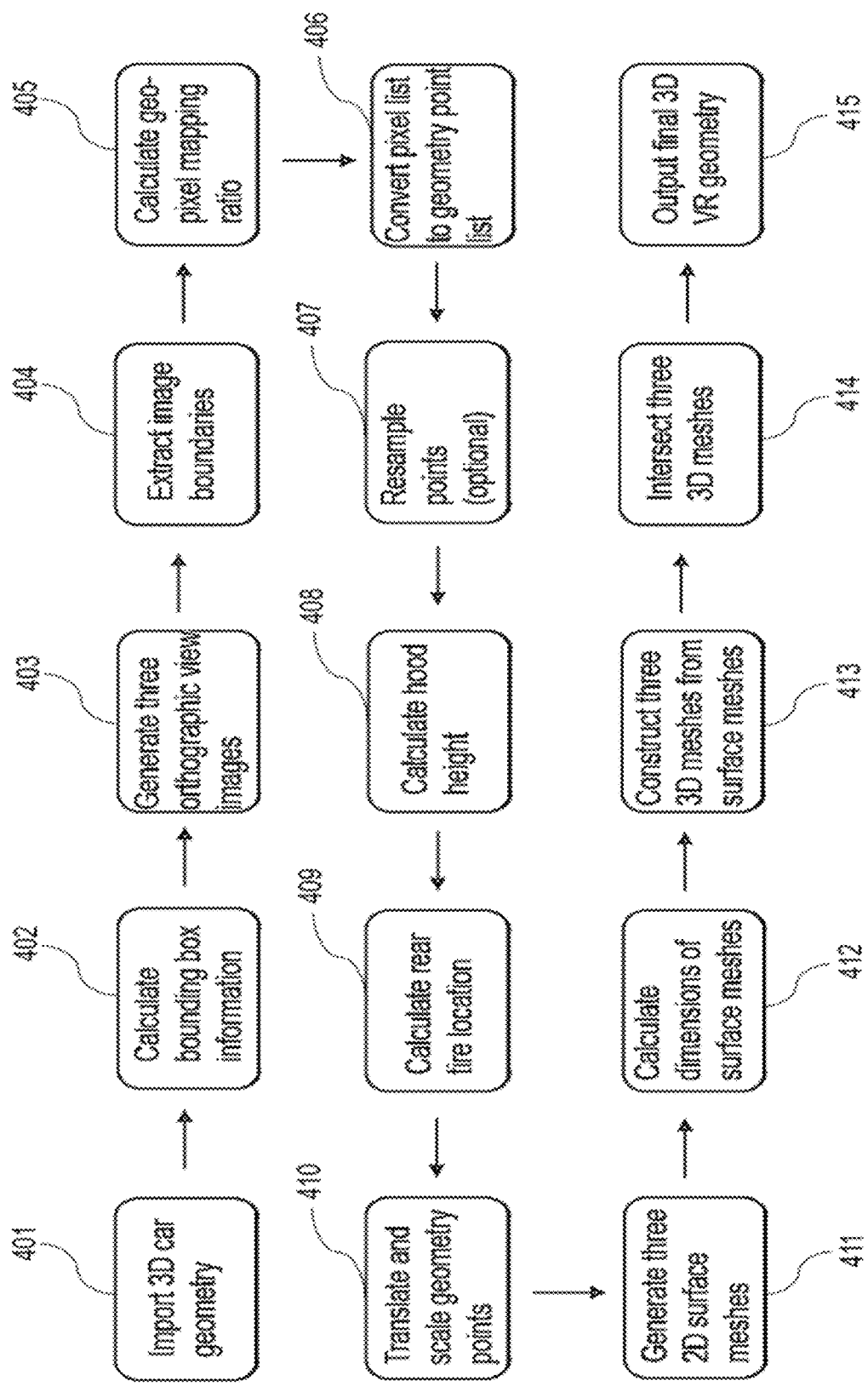
FIG. 6 is a detailed flowchart showing an implementation of a process to create VR regions using image processing technology.

FIG. 6 is a flowchart that represents an implementation of a process that supports automatically creating three-dimensional (3D) car-shaped variable resolution region geometries from orthographic view images for numerical simulation process automation. As indicated, instead of performing complex operations on a 3D car mesh model directly to meet the various applicable distance requirements (e.g., as mentioned in connection with the discussions of FIGS. 4A, 4B, 5A, and 5B), the process utilizes image processing technology to convert this 3D problem to a 2D image domain first. Then the process manipulates the pixels of the 2D images with respect to all the distance requirements and converts the images to 2D surface meshes. Then, the invention reconstructs the 3D mesh models from these 2D surface meshes.

More specifically, first, the process includes (at 401) importing a three dimensional (3D) car geometry. More specifically, in a typical implementation, this step may include importing a computer representation of a geometry (e.g., 3D car geometry) into a computer environment that will facilitate initial steps in the automatic creation of geometries for VR regions (e.g., VR6 and/or VR7) based on the imported geometry. For example, this step may include importing a computer-implemented 3D model of the car from a software program that was used to create the model (e.g., CATIA® or SOLIDWORKS® computer-aided design (CAD) software, both of which are available from Dassault Systemes). Moreover, the 3D model of the car may be imported into a software program, such as a geometry tool or a geometry viewer (e.g., the eDrawings viewer for SOLIDWORKS® CAD software). In a typical implementation, the computer 250 may perform this importation in response to a human user selecting an import option at a user interface of the computer 250.

Figure 7:
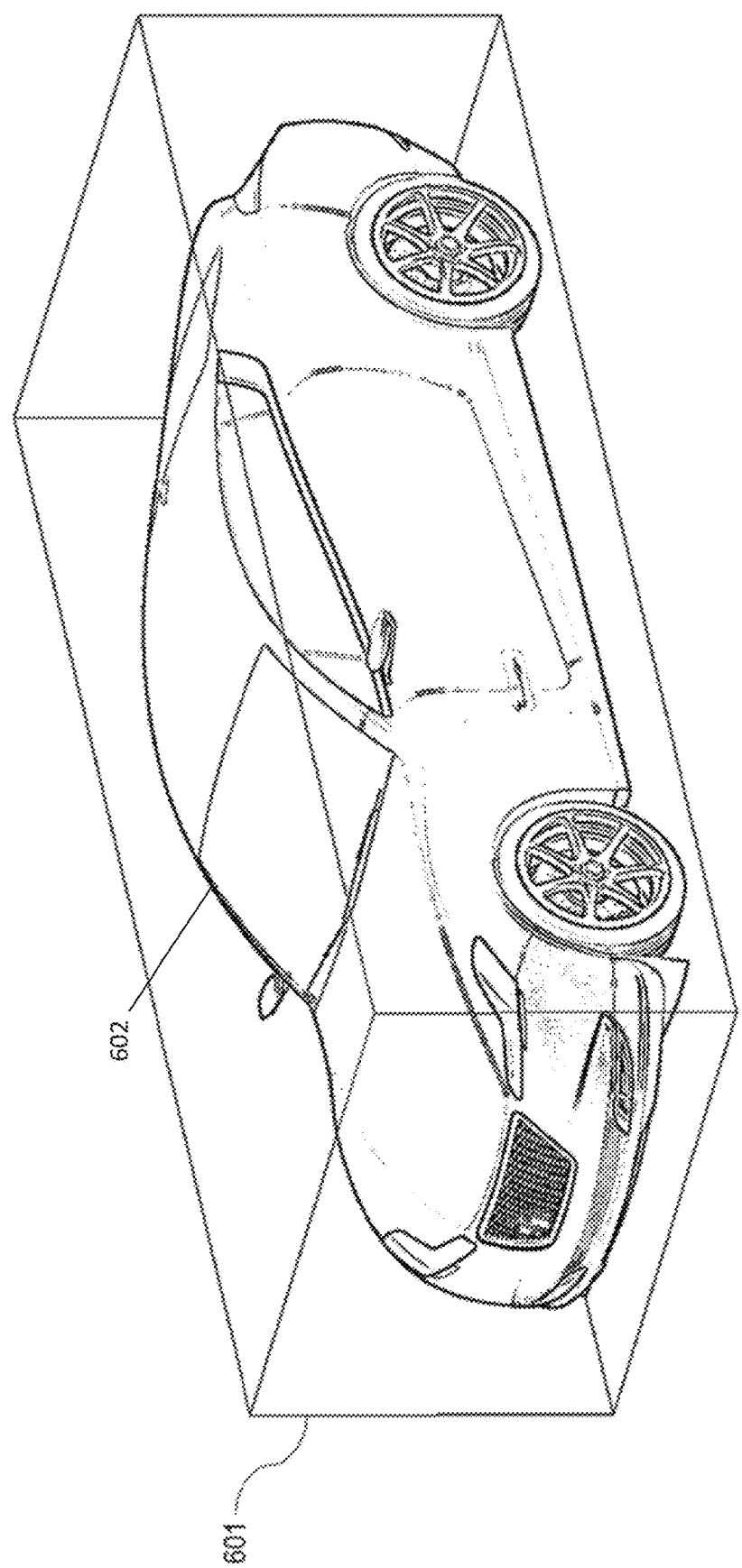
FIG. 7 is a screenshot showing a perspective view of a bounding box surrounding an image of a modeled car.

Next, the process includes (at 402) calculating bounding box dimensions for the modeled car based on the imported geometry. In a typical implementation, the bounding box defines the minimum or smallest bounding or enclosing box for the set of points that make up the car model with the smallest volume within which all the points lie. FIG. 7 shows a graphical representation of an example of a bounding box 601 surrounding a 3D model 602 of a car. The illustrated bounding box 601 is a square cuboid with a front surface that contacts the frontmost point of the modeled car 602, a rear surface that contacts a rearmost point of the modeled car 602, side surfaces that respectively contact a furthest points on either side of the modeled car 602, a bottom surface that contacts the lowest point of the modeled car 602, and a top surface that contacts a highest point on the modeled car 602. In some implementations, one or more of the bounding box surfaces may contact more than one point on the modeled car 602 if those points are all lie in the same plane and include the furthest point in that dimension. For example, in a typical implementation, the bottom surface of the bounding box 601 may contact the lowest point on more than one of the tires in the modeled car 602. The bounding box 601 thus defines the overall length, height, and width of the modeled car 602.

In a typical implementation, the computer 250 is configured to generate the bounding box directly from the imported geometry. In some implementations, the computer 250 stores computer executable instructions that, when executed by the computer 250, cause the computer to automatically generate a bounding box based on the imported geometry. In some such implementations, the computer 250 calls on this functionality automatically in response to the modeled object being imported (at 401). In some such implementations, the computer 250 is configured to present a user-selectable option at its user interface, the selection of which causes the computer 250 to call on this functionality to then automatically generate the bounding box 601 based on the imported geometry.

In some implementations, the computer 250 is configured to display the bounding box 601 together a view of the modeled car 602, as shown, for example, in FIG. 7. In some implementations, each dimension (length, height, and width) of the bounding box may be presented on the display or accessible to the user via the user interface. This step (calculating bounding box information at 402) can be removed from the process or skipped if, for example, the car dimensions already are known and have been stored in the computer 250 (e.g., in memory 254).

Figure 8B:
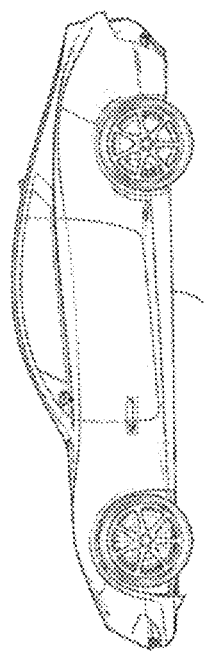
FIG. 8B is a side orthographic view screenshot of the modeled car of FIG. 8A.
Figure 8C:
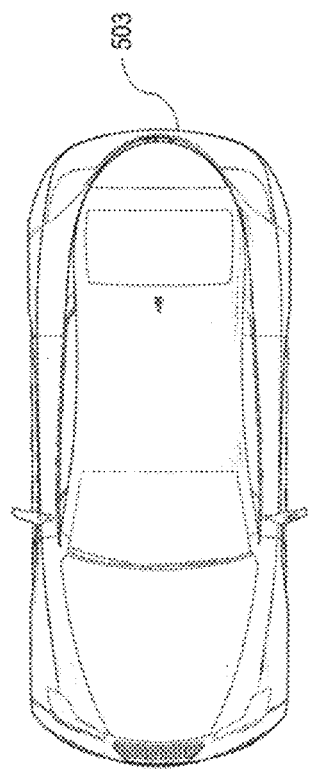
FIG. 8C is a top orthographic view screenshot of the modeled car of FIG. 8A.
Figure 8A:
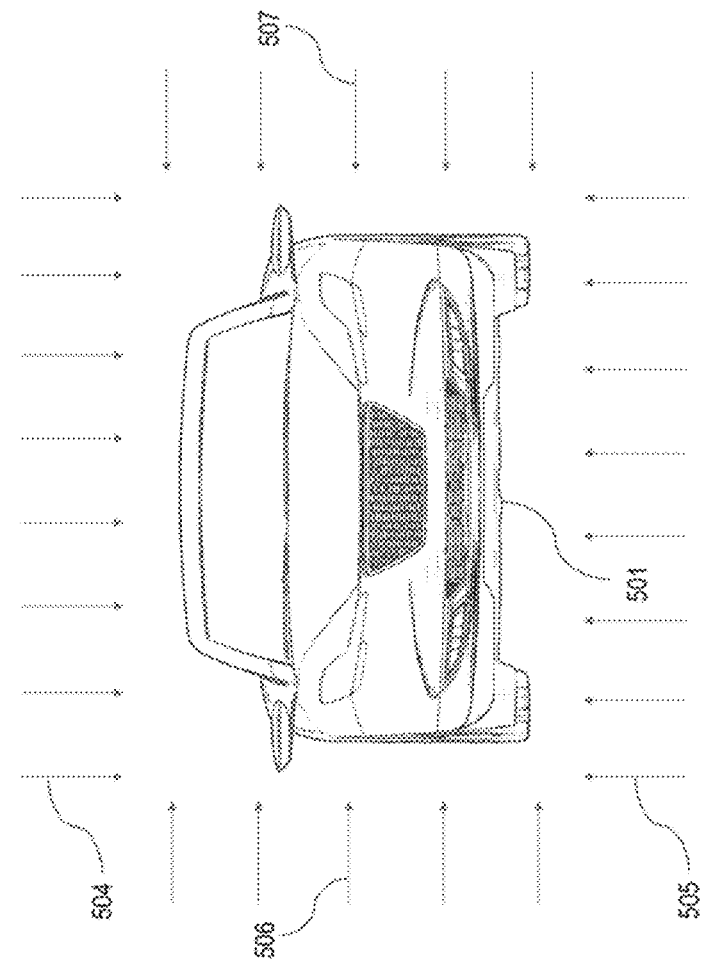
FIG. 8A is a front orthographic view screenshot of a modeled car with and rays cast toward the modeled car from four directions.

Referring again to FIG. 6, the next step in the illustrated process is to generate (at 403) three orthographic view images of the car based on the imported geometry. Each orthographic view image is a two-dimensional (2D) image of the car viewed respectively from one of three different perspectives (e.g., from the front of the car, from a side of the car, and from above the car). An example of these 2D images is shown in FIGS. 8A to 8C. More specifically, FIG. 8A includes a front orthographic view image 501 of the modeled car, FIG. 8B shows a side orthogonal view image 502 of the modeled car, and FIG. 8C shows a top orthogonal view image of the modeled car.

In some implementations, the computer 250 is configured to generate the three orthographic views (at 403) by applying orthographic projection onto the geometry that was imported (at step 401). Orthographic projection is a means of representing 3D objects (e.g., a 3D model of a car) in two-dimensions. It is generally a form of parallel projection, in which all the projection lines are orthogonal to a projection plane (e.g., one of either the front, a side, or the top surface of the bounding box generated at 402), resulting in every plane of the scene appearing in affine transformation on a viewing surface or viewing plane. It has been mentioned previously that the digital 3D geometry is loaded or imported into some geometry software or a pure geometry viewer. In most instances, the software or viewer supports defining viewing points/vectors/directions that control how the 3D geometry is displayed (e.g., on the computer's display screen). In some implementations, for example, the user can zoom in, zoom out, and/or rotate the geometry to achieve a desired angle of viewing. With appropriate scripting, however, these (and other) functionalities can be accessed and implemented automatically by the computer 250 without user input or intervention. In a typical implementation, the computer 250 does just that and accesses built-in functions to control the viewing direction, for example, X+, X−, Y+, etc. and the scripting controls selection of viewing direction, image screenshotting and exporting. In those instance, it is an automated process.

In a typical implementation, the three orthographic view images (e.g., screenshots of same) may be saved in memory 254.

Next, referring again to FIG. 6, the process (at 404) includes extracting image boundaries. In a typical implementation, the three orthographic view images (shown in FIGS. 8A to 8C) are fed into step 404 where the contours or edges of the three images may be extracted using a computer-implemented ray casting method.

Ray casting refers to a technique in which virtual rays are cast onto an image to produce an outline of that image. In a typical implementation, for each of the three orthographic image views (e.g., the front view 501 of FIG. 8A, the side view 502 of FIG. 8B, and the top view 503 of FIG. 8C), the computer 250 casts virtual rays in a horizontal or vertical direction, toward the image and within a plane of the image (e.g., from above, below, and from each side of the image). An example of this is represented in FIG. 8A, which shows an orthographic front view image 501 of the car and virtual rays being cast toward the image from the above (rays 504), below (rays 505), from the right side (rays 506), and from the left side (rays 507).

As show, all the rays coming from a particular direction are parallel to one another and travelling in a direction that would be perpendicular, for example, to a corresponding one of the surfaces of the bounding box 601. Moreover, in a typical implementation, all the rays coming from a particular direction would be uniformly spaced and span the entirety of the image 501 of the car. For example, all the rays 504 coming from above the image 501 are vertically disposed, uniformly spaced, parallel to one another, and travelling in a direction that would be perpendicular to the upper surface of the bounding box 601. Moreover, the rays 504 coming from above the image 501 span the entirety of the image 501 of the car from the far left of the car to the far right of the car. Moreover, all the rays 506 coming from the right side of the car in the image 501 are horizontally disposed, uniformly spaced, parallel to one another, and travelling in a direction that would be perpendicular to the right side surface of the bounding box 601. Moreover, the rays 506 coming from the right side of the car in the image 501 span the entirety of the image 501 of the car from the very bottom of the times to the very top of the car.

The collection of virtual rays 504, 505, 506, 507 being cast at the front orthogonal image view 501 from four different orthogonal directions, top 504, bottom 505, right 506 and left 507 sides relative to the image of the car originate from points outside the modeled object (car) and fully scan the 2D contours of the illustrated image (i.e., the front orthogonal view of the car).

In an exemplary implementation, each ray proceeds from its origin toward the image of the car, traversing the empty (or white) space therebetween. Each pixel along the path of the ray is considered. Once the ray reaches a non-white pixel, the computer 250 records (e.g., in memory 254) information about that non-white pixel (including, e.g., the position of that pixel). That ray is then finished its traversal. The first non-white pixel that the ray reaches is a point of intersection and is treated as a point along an edge of the image of the car. These points of intersection would collectively represent the outer edge (or an outline) of the car as viewed from the corresponding perspective (e.g., front, side, or top). The pixel information recorded may include coordinates that identify the corresponding intersection point by associated coordinates. All the points that get recorded using this ray casting technique on a particular one of the orthographic images lie along an outer edge of that orthographic image. Thus, plotting these points on axes of a coordinate system, for example, would present an outline of the corresponding orthographic image.

The number of rays cast toward the orthographic view image during a particular ray casting process influences the level of detail provided in a particular outline. In general, if more rays are cast toward the orthographic image, more intersection points may be recorded, and if more intersection points are recorded, the resulting outline (or edges) view of the underlying object may be more densely populated (e.g., with intersection points), and if the outline (or edges) view is more densely populated with intersection points, then the outline (or edge) view may provide a greater level of detail about modeled object (e.g., car), especially for small structural features on the modeled object.

Although rays 504, 505, 506, 507 are only shown being cast toward the front orthogonal image view 501 of the car in FIG. 8A, in a typical implementation, similar sets of rays (e.g., from four different orthogonal directions) would be cast toward the side orthogonal image view 502 and the top orthogonal image view 503, as well. Each of these additional ray castings would produce a listing of intersection point coordinates (saved to memory 254) that correspond to an outline of the car, but from a different perspective than the front image view perspective. For example, the ray casting process applied to the side orthogonal image view 502 would produce a listing of intersection point coordinates that correspond to an outline of the car from a left side image view perspective. Likewise, the ray casting process applied to the top orthogonal image view 503 would produce a listing of intersection point coordinates that correspond to an outline of the car from a left side image view perspective. Thus, for each image, rays starting at each side of the image are cast toward the image from four orthogonal directions, top, bottom, left, and right relative to the car model in order to fully scan the 2D contours of the image.

Optionally, if the car model has a complex exterior shape, the computer 250 may direct additional rays or sets of rays from other casting angles toward one or more of the orthogonal image views of the modeled car. These additional rays or sets of rays may be directed from angles that are other than perpendicular to any of the bounding box surfaces. These additional rays or sets of rays may be able to reach corners or areas that are not accessible by any of the rays using the "four-direction" method (represented in FIG. 8A, for example). Any intersection points—between these additional rays and the outer edge of the corresponding orthogonal image view—would be recorded and saved into memory 254.

Figure 9B:
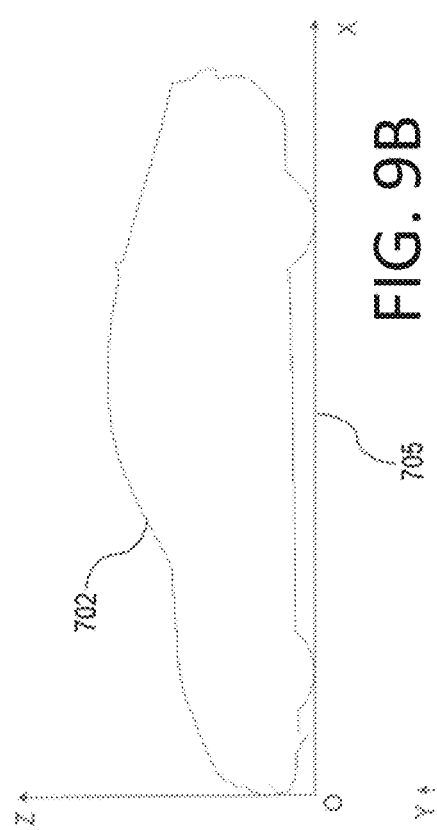
FIG. 9A-9C shows the car contour images obtained from the three orthographic view images using ray casting method.
Figure 9C:
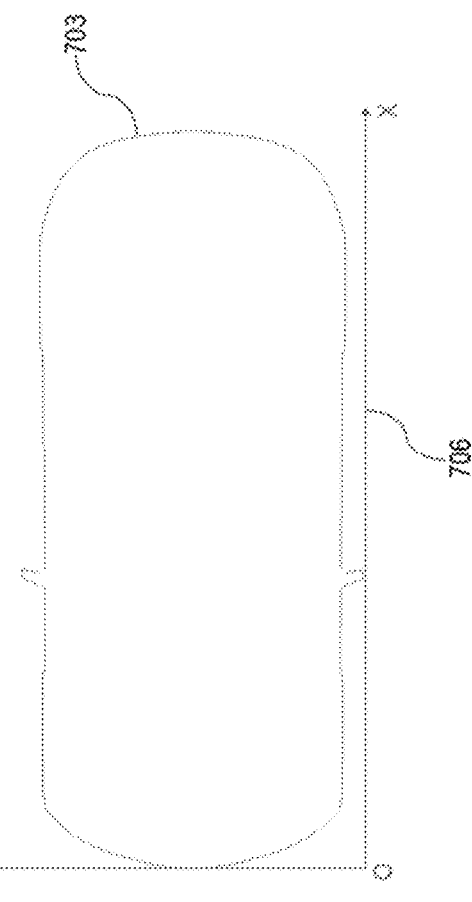
Figure 9A:
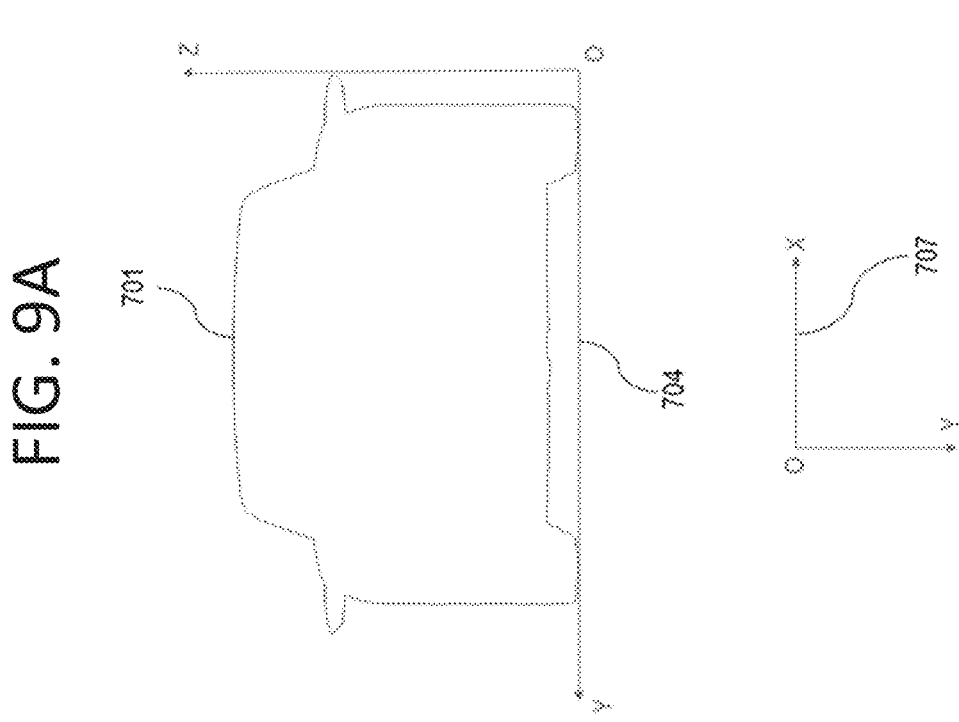

In a typical implementation, the computer 250 may be configured to produce outline images (e.g., at the computer's display) that represent the outer edges of modeled car based on the intersection points saved during the ray casting processes. FIGS. 9A to 9C show views of these outline images respectively representing the outer edges of the modeled car that was scanned in the aforementioned ray casting process. The outline images include a front view perspective outline image 701, a side view perspective outline image 702, and a top view perspective outline image 703. Each of these outline images is placed on a two-dimensional (2D) Cartesian coordinate plane (704, 705, 706, 707) and is made up of a collection of points plotted onto the Cartesian coordinate plane at positions that correspond to the intersection points that were identified (and saved) during the ray casting process (at 404). In a typical implementation, the computer 250 is configured to save (e.g., in memory 254) any such outline images generated based on the ray casting outcomes.

FIG. 9A, for example, shows an outline image 701 of the modeled car from a front perspective. The computer 250 generates this front perspective outline image 701 based on the listing of intersection points collected from ray casting the front orthographic view image 501 of the modeled car in FIG. 8A. It can be seen that, in the illustrated example, the outline image 701 in FIG. 9A has the same shape as the outermost contours of the modeled car as it appeared in the front orthographic view image 501 of FIG. 8A. The outline image 701 in FIG. 9A is placed on its 2D Cartesian coordinate plane 704 (i.e., a plane defined by a Y-axis and a Z-axis in the illustrated example) with its bottommost point(s) on the y-axis and its rightmost point on the z-axis. Every point on the outline image 701 in FIG. 9A has a corresponding set of coordinates based on the 2D Cartesian coordinate plane 704. Therefore, dimension information, including (e.g., width and height in FIG. 9A) for the outline image 701 can easily be determined based on point coordinates.

In a typical implementation, the computer 250 determines dimension information (including, e.g., width and height) for the outline image 701 by identifying the image point with the leftmost y-axis coordinate in the image (for width) and by identifying the image point with the highest z-axis coordinate in the image (for height).

FIG. 9B, for example, shows an outline image 702 of the modeled car from a side perspective. The computer 250 generates this side perspective outline image 702 based on the listing of intersection points collected from ray casting the side orthographic view image 502 of the modeled car in FIG. 8B. It can be seen that, in the illustrated example, the outline image 702 in FIG. 9B has the same shape as the outermost contours of the modeled car as it appeared in the side orthographic view image 502 of FIG. 8B. The outline image 702 in FIG. 9B is placed on its 2D Cartesian coordinate plane 705 (i.e., a plane defined by an x-axis and the z-axis in the illustrated example) with its bottommost point(s) on the x-axis and its leftmost point on the z-axis. Every point on the outline image 702 in FIG. 9A has a corresponding set of coordinates based on its 2D Cartesian coordinate plane 705. Therefore, dimension information, including (e.g., length and height in FIG. 9B) for the outline image 702 can easily be determined based on point coordinates.

In a typical implementation, the computer 250 determines dimension information (including, e.g., length and height) for the outline image 702 by identifying the image point with the rightmost x-axis coordinate in the image (for length) and by identifying the image point with the highest z-axis coordinate in the image (for height).

In a typical implementation, the height determined by considering the image point in FIG. 9B with the highest z-axis coordinates should be the same as the height determined by considering the image point in FIG. 9A with the highest z-axis coordinates. In some implementations, the computer 250 may compare these two determinations and, if they differ, the computer 250 may discard the results and return to an earlier step in the process (e.g., step 404) to redo some portion of the process. If the computer 250 makes this comparison and the comparison reveals a match, then the process is simply allowed to continue.

FIG. 9C, for example, shows an outline image 703 of the modeled car from a top perspective. The computer 250 generates this top perspective outline image 703 based on the listing of intersection points collected from ray casting the top orthographic view image 503 of the modeled car in FIG. 8C. It can be seen that, in the illustrated example, the outline image 703 in FIG. 9C has the same shape as the outermost contours of the modeled car as it appeared in the top orthographic view image 503 of FIG. 8C. The outline image 703 in FIG. 9C is placed on its 2D Cartesian coordinate plane 706 (i.e., a plane defined by the x-axis and the y-axis in the illustrated example) with its bottommost point on the x-axis and its leftmost point on the y-axis. Every point on the outline image 703 in FIG. 9C has a corresponding set of coordinates based on its 2D Cartesian coordinate plane 706. Therefore, dimension information, including (e.g., length and width in FIG. 9C) for the outline image 703 can easily be determined based on point coordinates.

In a typical implementation, the computer 250 determines dimension information (including, e.g., length and width) for the outline image 702 by identifying the image point with the rightmost x-axis coordinate in the image (for length) and by identifying the image point with the highest z-axis coordinate in the image (for width).

In some implementations, the computer 250 may compare these determinations (of length and width based on the FIG. 9C image 703) to other determinations (e.g., based on the FIG. 9A image 701 and/or the FIG. 9B image) and, if they differ, the computer 250 may discard the results and return to an earlier step in the process (e.g., step 404) to redo some portion of the process. If the computer 250 makes this comparison and the comparison does not reveal a discrepancy, then the process is simply allowed to continue.

In a typical implementation, the computer 250 saves (e.g., in memory 254) all the dimensional data (length, width, height) for the outline images 701, 702, 703 determined at this step.

Referring again to FIG. 6, in the next step of the illustrated process, the computer 250 calculates (at 405) a geo-pixel mapping ratio to represent the mapping relationship between the pixels in the 2D domain (e.g., as represented by the outline images and related coordinates in FIGS. 9A to 9C) and a 3D ("real-world geometry") domain. In a typical implementation, the computer 250 will have determined, by having generated the bounding box (at 402) the length, width, and height of the 3D modeled car. If, for example, the computer 250 (at step 404) has assigned 1000 pixels across the length of the car, and the bounding box calculations (at 402) revealed a car length of 5000 millimeters, then the computer 250 (at 405) concludes that, in the length direction, 1 pixel represents 5 millimeters. The geo-pixel mapping ratio, in the length direction, for this example, would be 5:1. Similar determinations may be made in other directions as well (e.g., in the width direction and in the height direction). In some implementations, the geo-pixel mapping ratio may be the same in the different directions. In some implementations, the geo-pixel mapping ration may be different in different directions.

In an exemplary implementation, the first step in calculating a geo-pixel mapping ratio (at 405) is to construct a mapping relationship between the pixel/image domain P and the geometry domain G to identify the relationship between their coordinate systems. In general, the image/pixel domain just may refer to the world of images in which the computer 250 deals with pixels, while the geometry domain may refer to the real world. The coordinate system (e.g., 707, see FIG. 9A) for the image domain is different from the coordinate system 804 in the 3D geometry domain. For example, the origin of the coordinate system 707 in the image domain (see FIG. 9A) is at the top left corner of the image with its positive Y direction pointing downward and its positive X direction pointing to the right relative to the image. In the geometry domain, however, the coordinate system used to generate the geometry point list for each side is the same as the one 804 (see FIG. 10) used in the 3D car geometry except that the origin is translated when analyzing the points of each side so that the zero points for both directions fall on the boundaries of the 2D point cloud. For example, coordinate planes 704, 705 and 706 are the coordinate planes for the front, side, and top views of the modeled car outline views, respectively.

Eq. (1)-(4) demonstrates the relationship between the pixel domain P and the geometry domain G for the boundary points:

$$PD_{y\_min} = GD_{z\_max} \tag{1}$$

$$PD_{y\_max} = GD_{z\_min} \tag{2}$$

$$PD_{x\_min} = GD_{x\_min} \tag{3}$$

$$PD_{x\_max} = GD_{x\_max} \tag{4},$$

where min means minimum, max represents maximum, PD refers to the (2D) pixel domain, and GD refers to the (3D) geometry domain. Thus, according to the foregoing relationships, the minimum y dimension in the 2D pixel domain would equal the maximum z dimension in the 3D geometry domain (per equation 1), the maximum y dimension in the 2D pixel domain would equal the minimum z dimension in the 3D geometry domain (per equation 2), the minimum x dimension in the 2D pixel domain would equal the minimum x dimension in the 3D geometry domain (equation 3), and the maximum x dimension in the 2D pixel domain would equal the maximum x dimension in the 3D geometry domain (equation 4).

In an exemplary implementation, the converting ratio R between the pixel domain and the geometry domain can be calculated (by computer 250) with Eq. (5)-(7) for the three views. R may be different for the three views as the viewing angles and the virtual camera locations relative to the car model could not be guaranteed to be the same when capturing the three screenshots of the car model.

$$R_{front} = \frac{\text{Vehicle Height}}{HP_{front}} \tag{5}$$

$$R_{side} = \frac{\text{Vehicle Length}}{LP_{side}} \tag{6}$$

$$R_{top} = \frac{\text{Vehicle Length}}{LP_{top}}, \tag{7}$$

where HP is the vehicle height in the unit of the pixels and LP is the vehicle length in the unit of the pixels. Once calculated, the calculating ratio(s) R may be used by the computer 250 to map the pixel list of the edges (e.g., that were used to generate the outline views/image boundaries at 404, see also FIGS. 9A to 9C) to the 3D ("real-world geometry") domain (e.g., in step 406 of FIG. 6). Thus, given the obtained pixel point list P(x, y) for each image (e.g., in FIG. 9A to 9C), the computer 250 calculates a geometry point list G (at 406) using Eq. (8)-(10).

$$G_{front} = \begin{pmatrix} G_y \\ Gz \end{pmatrix} = \begin{pmatrix} (PD_{x\_max} - P_x) * R_{front} \\ (PD_{y\_max} - P_y) * R_{front} \end{pmatrix}, \quad (8)$$

$$G_{side} = \begin{pmatrix} G_x \\ Gz \end{pmatrix} = \begin{pmatrix} (P_x - PD_{x\_min}) * R_{side} \\ (PD_{y\_max} - P_y) * R_{side} \end{pmatrix}, \quad (9)$$

$$G_{top} = \begin{pmatrix} G_x \\ Gy \end{pmatrix} = \begin{pmatrix} (P_x - PD_{x\_min}) * R_{top} \\ (PD_{y\_max} - P_y) * R_{top} \end{pmatrix}, \quad (10)$$

where $P_x$ and $P_y$ are the x and y components of the points in the pixel point list P(x, y) and $G_x$ and $G_y$ are the x and y components of the points in the geometry point list G(x, y).

A geometry point list is typically a listing of point sets, with an x and y value identifying coordinates for each geometry point, for example. Here is an exemplary representation of a geometry point list:
[108.38171828904731, 132.46654457550227]
[939.3082251717434, 870.0643495981853]
[2658.362701367466, 1315.633635897602]
[84.29689200259236, 144.50895771872976]
[27.09542957226183, 183.64680043421907]
[105.37111500324045, 569.00402101174984]
[4374.406574277382, 948.340035029164]
[4064.314435839274, 186.657403720002594]
[812.8628871678549, 861.0325397407648]
[2041.1890277770578, 138.487751147116]
[3185.218276383668, 162.57257743357098]
[1511.3228494750488, 129.4559412896954]
[3760.2435039727807, 1125.96562888917693]
[1041.668736889177, 876.08555561697991]
[246.86946943616334, 665.34333261633182]
[42.14844600129618, 270.95429572261827]
[3555.5224805379135, 1183.1670913220999]
[1514.3334527608556, 927.2658120285159]
[316.11334500972134, 698.4599623071938]
[3952.92211426442, 1065.7535631756318]
[4067.3250391250813, 186.657403720002594]
[948.340035029164, 42.14844600129618]
[1514.3334527608556, 129.4559412896954]
[4642.350266714193, 689.4281524497732]
[4296.130888846404, 201.71042014906027]
[93.32870186001297, 547.9297980168503]

In a typical implementation, the computer 250 may perform the foregoing calculations and store the results (e.g., in memory 254).

A resampling process (e.g., in step 407) may be implemented to increase or decrease the point density depending on the quality of the obtained pixel or geometry points. This is an optional step and may be implemented to help optimize the balance between cost and accuracy. In an exemplary implementation, when resampling is applied, the computer 250, instead of using all points (say, e.g., 10 k points) to create the 2D mesh which will be accurate but expensive, the computer 250 picks every 2, or every 3, or every N points (N=any integer 2 or more) in the list to keep and discards the rest. Thus, information representing the overall contour(s) is maintained but the resolution or the number of points is decreased. Since the points can be sorted in a clockwise or counter-clockwise order relative to a center of all points, selecting every N points will generally not create significant issues as long as N is not too large. This process is referred to as resampling or down-sampling. Other resampling methods may be used too in certain implementations.

Next, according to the process represented in the FIG. 6 flowchart, the computer 250 (at 408) calculates a hood height of the modeled car. In a typical implementation, to calculate the hood height 310, in step 408, the computer 250 first calculates or identifies, from among the list of points in the geometry point list G(x, y), the lowest point of a front tire of the modeled car. The computer 250 may perform this function by sorting the geometry point list obtained (e.g., from image 702) to find the two lowest points in the vertical direction (i.e., the two points with the lowest z-axis coordinate). Assuming the positive x direction is defined from front of the car to the rear (as shown in FIG. 9B, for example), then the one which has a lower value (for the x-axis coordinate) will be for the front left tire, and the other point will be for the rear left tire. The rear tire point may be used in step 409 to identify the location of the rear tire. Starting from the lowest point at the front tire, a ray is cast directly upward (i.e., in a vertical direction, e.g., parallel to the z-axis in FIG. 9B). The distance that the vertical ray travels before hitting the next point (i.e., the intersection point) in the image, which represents the hood of the car, is the target hood height (e.g., 310 in FIG. 5A). This distance will be indicated by the value of the z-axis coordinate at that intersection point. The computer 250 typically saves this value (e.g., in memory 254).

Next, according to the process represented in the FIG. 6 flowchart, the computer 250 (at 409) calculates or identifies a rear tire location for the modeled car. This was mentioned above. The computer 250 typically saves this value (e.g., two coordinates, e.g., x and z) as well (e.g., in memory 254).

Next, according to the process represented in the FIG. 6 flowchart, the computer (at 410) translates and scales the points from the geometry point list G(x, y) for each view (including a front view list, a side view list, and a top view list), with respect to the distance requirements for both VRs (VR6 and VR7). In a typical implementation, the distance requirements (which are represented in FIGS. 4A, 4B, 5A, and 5B, for example), may be accessed by the computer 250 for these purposes from its memory 254. These three base geometry lists are used, therefore, by the computer 250, to create VR6 and VR7 in separate processes. In an exemplary implementation, scaling may involve multiplying each point (e.g., in the list of points) by a scaling factor, say 0.5. So [93.32870186001297, 547.9297980168503] becomes [46.xxx, 273.xxx]. Translation, in an exemplary implementation, may involve adding some value to these points.

Creating VR7 can be easier than creating VR6 as the scaling is uniform along each direction in VR7. According to an exemplary implementation, first, the points in the side view geometry list are scaled by a factor calculated from the ratio of the length of VR7 and the car length 203. The point list is then translated along the negative x direction so that the center of the scaled points along x direction will not change during the translation process. Similarly, uniform scaling and translation are performed along the vertical direction so that the distance 207 can be achieved. This scaling and translation method is also applied on the top and side view geometry point lists to obtain the points for these two views.

As for VR6 creation, a similar uniform scaling and translation is applied along the vertical and lateral directions but with larger values. Since the distance requirement is different for the front and rear region along x direction, the side and top view geometry point lists are first scaled and translated to meet the requirement for distance 303. Then the computer 250 uses the lowest point of the rear tire (calculated in step 409) as a separating point to divide the lists into two children point lists. Any point whose x value is larger than the x value of the separating point belongs to the rear child point list. Any point whose x value is not larger than the x value of the separating point does not belong to the rear child point list. Then the rear child point list is translated by a distance so that the distance between the translated rear child point list and the rear bumper of the car model is equal to rear distance 304 in FIGS. 5A and 5B. Now, this translation leaves a gap between the front and rear children lists. In a typical implementation, the computer 250 applies linear interpolation using the two ending points from the two children lists to add adequate points to fill this gap. Although this approximating treatment creates a flat shape around the separating area, the influence on the flow is negligible because the affected region is relatively small, and it is further away from the rear window of the car as compared to VR7.

At this point, all the geometry points of VR6 and VR7 for three views have been generated. The computer 250 typically saves these points (e.g., in memory 254). The phrase pixel points typically refers to a collection of pixel points, where each pixel is a point in an image and has data that describes its location within that image. For example, pixel point P may have its location at coordinates [3, 8], which are stored in computer memory 254. The computer 250 can find the pixel's location within an image using these coordinates (on an x, y axis, for example). When the computer 250 multiplies each pixel point by a mapping factor, defined in Eq. 5-7, the result is a geometry points list.

Next, according to the process represented in the flowchart of FIG. 6, the computer 250 (at 411) generates 2D surface meshes for each view from these image points. In a typical implementation, the computer 250 utilizes a 2D triangle mesh generator such as one described in a 1996 article by Shewchuk J. R., entitled *Triangle: Engineering a 2D Quality Mesh Generator and Delaunay Triangulator*, in: Lin M. C., Manocha D. (eds) Applied Computational Geometry Towards Geometric Engineering. WACG, Lecture Notes in Computer Science, vol 1148.

Figure 10:
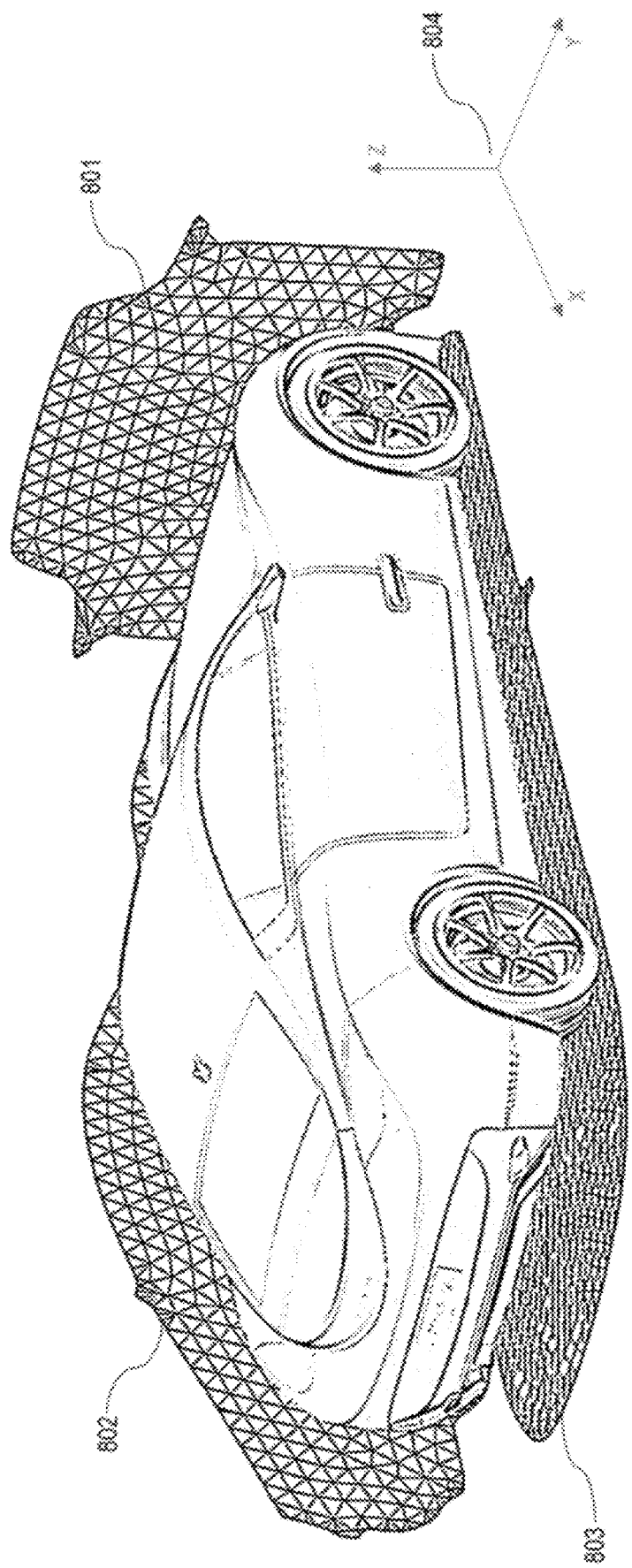
FIG. 10 illustrates the generated 2D surface meshes from the three orthographic view images of the car model for algorithm validation purpose.

Springer, Berlin, Heidelberg to accomplish this. In some implementations, the generator takes a 2D point cloud serving as a boundary or constraint for a target mesh and uses a constrained Delaunay triangulation method to generate a triangle mesh (e.g., by converting each point into a triangular cell of the mesh). Optionally, the resulting mesh may then be re-meshed to further improve quality. As an effort to validate the algorithm, the geometry point list for each view of the car model may be fed into the mesh generator. An example of the resulting meshes are shown in FIG. 10. These include a front view mesh 801, a side view mesh 802, and a top view mesh 803. The computer 250 typically stores these meshes 801, 802, and 803 (e.g., in memory 254).

"Re-meshing" generally involves creating a different meshing size based on the input mesh. For example, if the computer 250 has (e.g., is storing) a mesh with a meshing size of 10 mm, the computer may determine that the meshing size is too coarse or too fine (e.g., by comparing the meshing size to predefined parameters stored in computer memory 254). If the computer 250 determines that the meshing size for a particular mesh is too coarse or too fine, then the computer 250 may use a geometry tool to create a different mesh with a coarser or finer meshing size. The geometry associated with the different mesh would still represent the original model, but the meshing resolution will have been changed. This process is referred to generally as "re-meshing".

In various places, the current document uses the phrases 2D point cloud, 2D point list, and geometry list interchangeably. Unless otherwise indicated, these are related terms that generally refer to the same basic set of concepts.

Next, according to the process represented in the FIG. 6 flowchart, the computer 250 (at 412) calculates the dimensions of the surface meshes for both VR6 and VR7. The dimensions here may refer, for example, to the length, height, and width of bounding boxes for VR6 and VR7. Thus, the bounding box is calculated for VR6 and VR7 separately to get the dimensions. These dimensions are used in step 413 where the computer 250 constructs three 3D meshes from the surface meshes. More specifically, in step 413, three intermediate 3D meshes are created from the three 2D surface meshes generated out of step 411. In an exemplary implementation of this step, each 2D surface mesh is processed by the computer 250 based on the workflow represented by the flowchart in FIG. 11.

Each triangle facet has two sides, and as a tradition, the side facing outward relative to the car model is usually considered the positive side (as it will be here). In step 901 (of FIG. 11), the computer 250 flips the facets, if needed, so that the negative sides of all facets are always pointing toward the interior of the car. Then (at 902), the computer 250 duplicates the 2D surface mesh. Next (at 903), the computer 250 extrudes the duplicated mesh by a distance. The extrusion typically happens along normal relative to a surface of the negative side of the duplicated mesh. In a typical implementation, the distance of the extrusion is the output of step 412 (in FIG. 6). For example, to process the front view mesh, the duplicated mesh of 801 is extruded along X direction by a distance equivalent to the length of VR6 or VR7, as applicable, in the X direction. A 3D closed mesh is thus created.

Referring, for example, to FIG. 12A, to get this 3D mesh, the input may be the mesh, single-sided as shown in 801 in FIG. 10. This mesh 801 is the front face of FIG. 12A. In an exemplary implementation, the computer 250 creates a 3D mesh from 801/the front face by creating a mirror of 801 and using (or designating it in memory, for example) as a back face. Then, the computer 250 uses covers to connect the front and back face. In a typical implementation, the computer 250 creates the back face by duplicating the front face 801 and then translating the duplicate version of the front face by a distance (e.g., predefined and stored in computer memory) to reach the back face location. It's like you are given a piece of paper with a dimension of 10" by 10". Now you are asked to create a cuboid with a depth of 20". One way to do is to find another piece of paper with the same dimension of 10"×10", and then place it 20" away from the original paper (imaging both paper are standing on their edge on a table). Now you get two piece of square paper, one is located at X=0, and the other one is at X=20. The remaining work is the find more paper to form the top, bottom, and the sides which connect the front the back. Now you have a full cuboid.

Next, the computer 250 (at 904), optionally, flips the facets of the extruded mesh. This may be needed to make sure all facets' positive normal are pointing outward. Depending on the curvature of the car exterior shape or the method used for converting points cloud to 2D meshes in 411, the 3D mesh that results from step 904 may not be clean or have a satisfying quality especially in the corner regions. Thus, according to the illustrated flowchart, the computer 250 wraps the mesh with a fine resolution (e.g., a smaller mesh sizing) in step 905 to further clean up the mesh.

Figure 11:
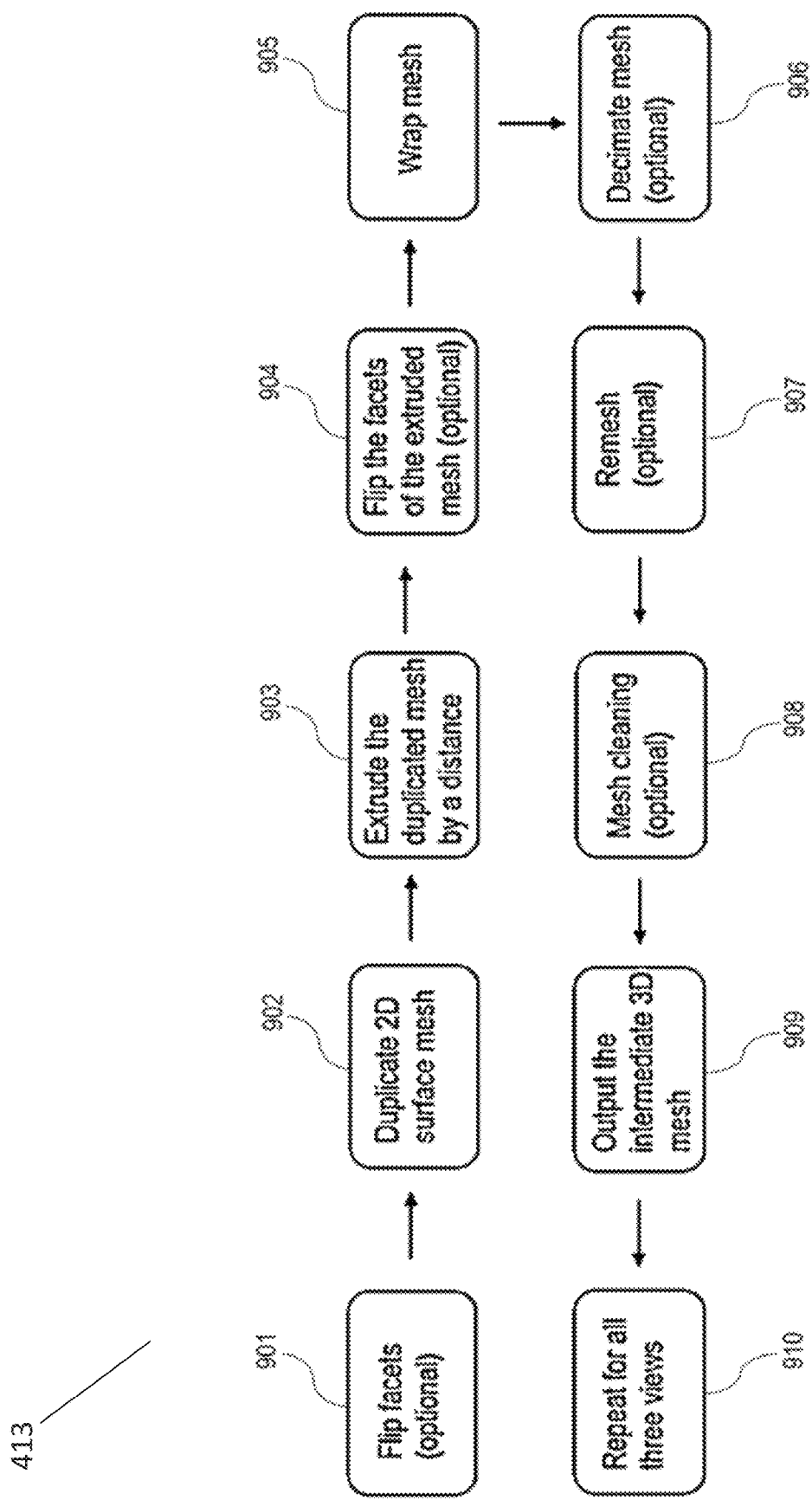
FIG. 11 is a flowchart showing an implementation of a process to construct 3D meshes from surface meshes.

Next, according to the process represented in the FIG. 11 flowchart, the computer 250 (at 906) (optionally) applies a mesh decimation to reduce the facet counts. In a typical implementation, a mesh decimating operation may be utilized here to reduce the number of faces in the mesh objects. Next, according to the process represented in the illustrated flowchart, the computer 250 (optionally) performs re-meshing and mesh cleaning operations (in 907 and 808) to further improve the mesh quality.

Then, the computer 250 (at 909) outputs the generated 3D intermediate mesh (e.g., to a user interface on the computer's display). The generated 3D intermediate mesh is also saved (e.g., in memory 254).

At last, the foregoing process is repeated for all other views in step 910.

FIGS. 12A to 12C show the three intermediate meshes, created by 413 (and the process represented in FIG. 9). The three intermediate meshes include intermediate mesh 1001 (FIG. 12A) for the front view, intermediate mesh 1002 (FIG. 12B) for the side view, and intermediate mesh 1003 (FIG. 12C) for the top view.

In a typical implementation, intermediate mesh 1001 has a cross-sectional shape that like the shape of the front view outline image 701 and a distance at least equal to the length of the modeled car. In a typical implementation, intermediate mesh 1002 has a cross-sectional shape that is like the shape of side outline image 702 and has a width that is at least equal to the width of the modeled car. In a typical implementation, intermediate mesh 1003 has a cross-sectional shape that is similar to the shape of top outline image 703 and has a height that is at least equal to the height of the modeled car.

Next, according to the process represented in the FIG. 6 flowchart, the computer 250 (at 414) intersects the three 3D meshes. Intersecting geometries is a functionality that is available as an application programming interface (API) in a variety of software for generating geometries. In an exemplary implementation, step 414 in the illustrated flowchart may involve calling and utilizing this functionality. In an exemplary implementation, the intersection of two or more objects is another object consisting of everything that is contained in all of the objects simultaneously.

Figure 13:
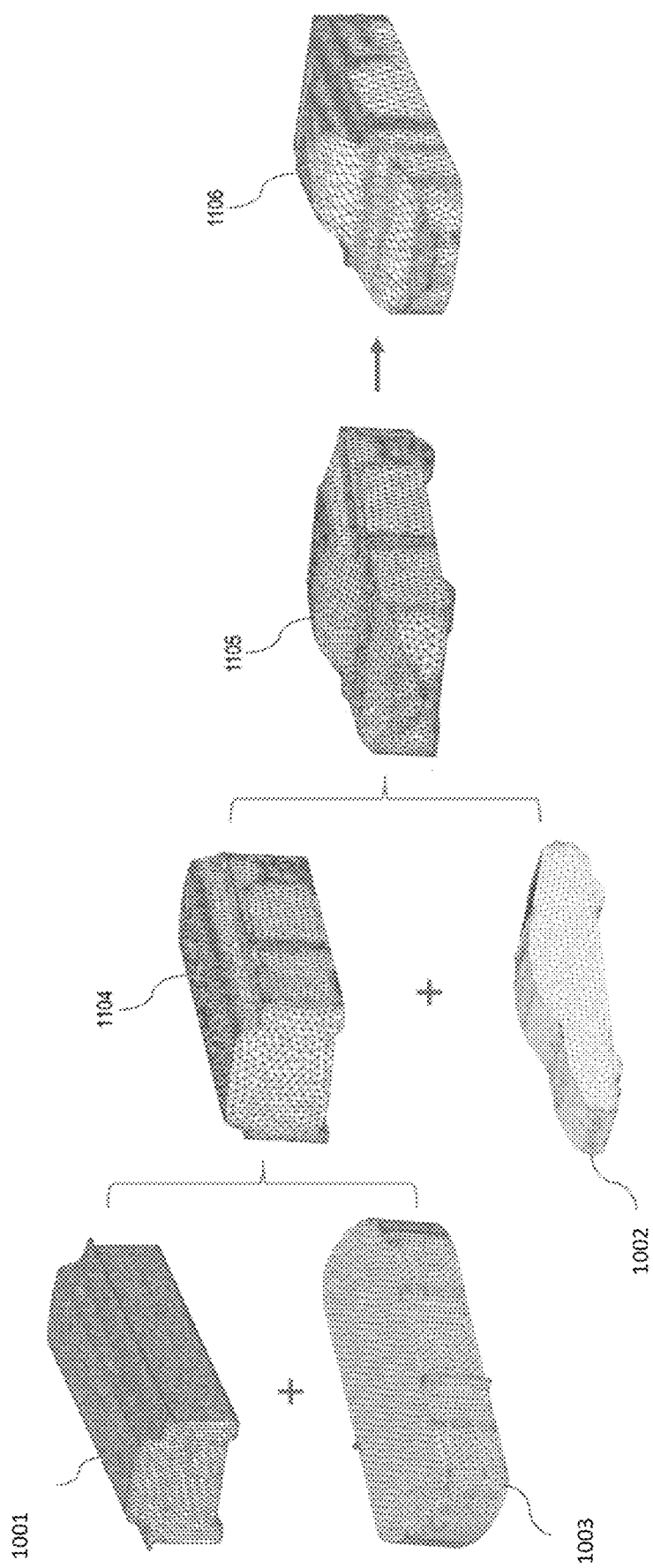
FIG. 13 is a schematic representation of an exemplary workflow for creating a final 3D VR mesh from three intermediate 3D meshes.

There are a variety of ways and sequences for performing these intersections. FIG. 13 represents one exemplary implementation of intersecting the three 3D meshes. According to the exemplary implementation in FIG. 13, the computer 250 performs Boolean operations between the front view 3D mesh 1001, and top view 3D mesh 1003 and only keeps the common region to obtain mesh 1104. The other (non-common) regions are deleted/discarded. Then, the computer 250 performs a second round of Boolean operations on mesh 1104 and the side view 3D mesh 1003 to produce mesh 1105. In various implementations, the order of these rounds of Boolean operations can be changed.

Referring again to FIG. 6, next (at 415), the computer 250 outputs the final 3D VR geometry. In some implementations, the computer 250 cuts and caps the bottom of mesh 1105. Then the computer 250 extrudes the bottom face of the mesh all the way down to a few centimeters below the ground so that it covers the gap between the tires and the ground to produce a final mesh (e.g., 1106 in FIG. 13). In some implementations, the computer 250 uses the point which has the smallest value in the X direction as the pivot point for the cutting operation. This pivot point is usually located at the front grille area of a car. This ensures that the generated VR geometry can have the largest volume as the volume would be smaller if the pivot were further lowered.

Figure 14:
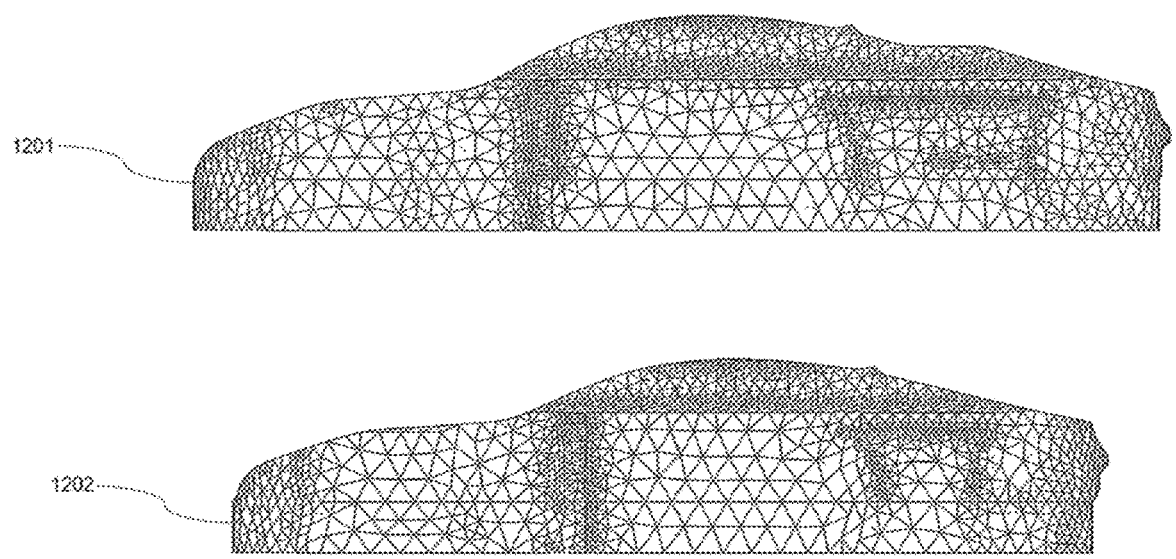
FIG. 14 shows the side view of an exemplary final mesh result for VR6 and VR7 of a modeled car.

The whole process is generally applied to produce VR6 and VR7 independently. FIG. 14 shows the side view of the final result of VR6 1201 and VR7 1202.

Figure 16:
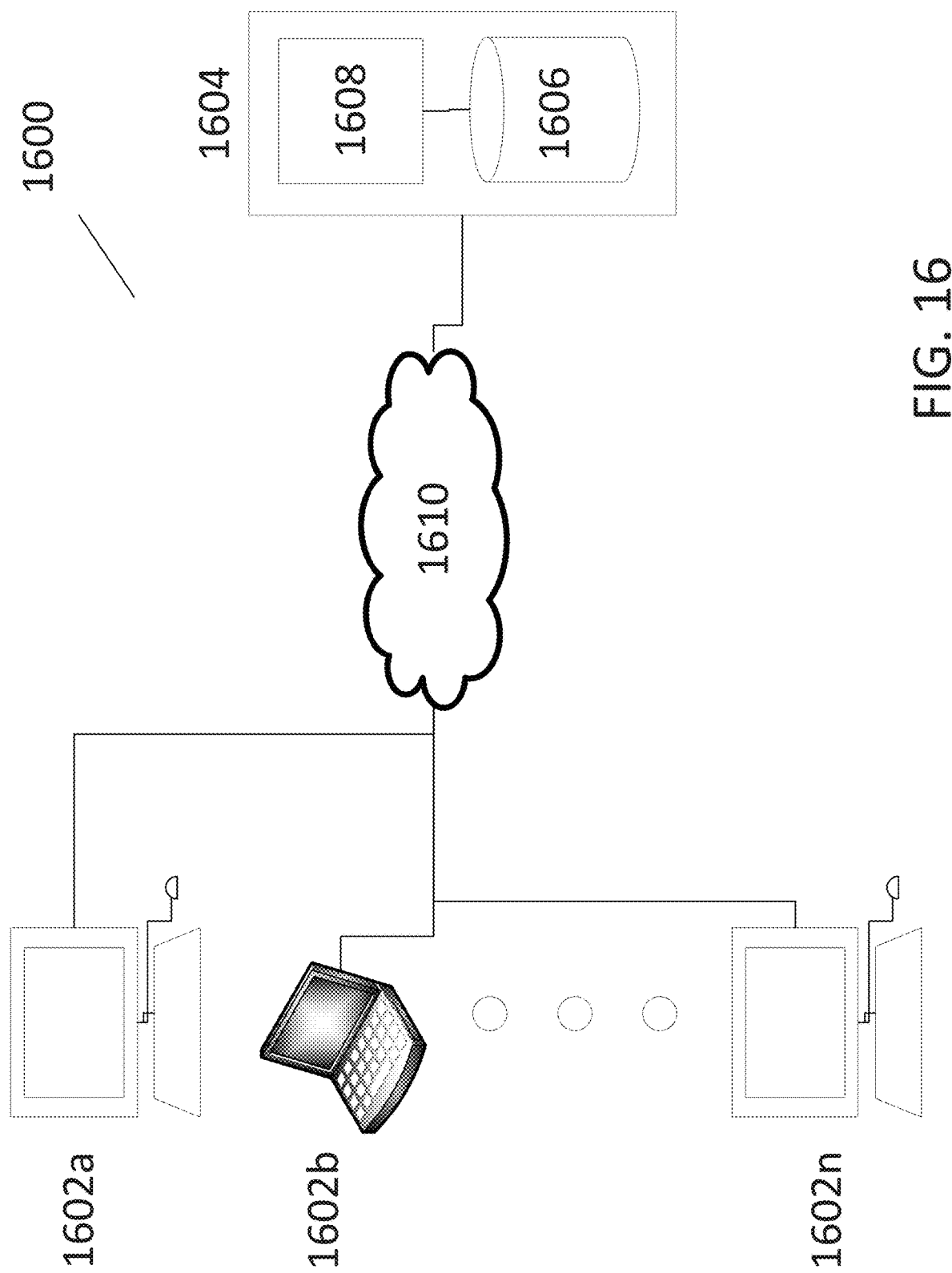
FIG. 16 is a schematic representation of an implementation of a computer system configured to perform the functionalities disclosed herein.

FIG. 16 is a schematic representation of an implementation of a computer system 1600 configured to perform the functionalities disclosed herein.

The illustrated computer system 1600 comprises a plurality of user workstations 1602a, 1602b . . . 1602n and a server 1604 with computer memory 1606 and a computer processor 1608. The workstations 1602a, 1602b . . . 1602n are coupled to the server 1604 and to each other via a communications network that enables communication therebetween. In a typical implementation, each of the user workstations 1602a, 1602b . . . 1602n may be implemented as a computer (e.g., computer 250) with computer memory, storage, a computer processor, I/O device interface (with one or more connected I/O devices), and a network interface (connected to the network 1610 to facilitate communications with other network-connected devices). Similarly, the server 1604 may be configured with storage, I/O device interface (with one or more connected I/O devices), and a network interface (connected to the network 1610 to facilitate communications with other network-connected devices).

The computer system 1600 is configured to implement the systems and techniques disclosed herein. In doing so, however, various implementations of the system 1600 may distribute various memory and processing functionalities among multiple different system components across the system. In a typical implementation, human users can access and interact with the system 1600 from any one or more of the user workstations 1602a, 1602b . . . 1602n and processing/memory functions may be performed at those user workstations and/or at processor 1604 with communications therebetween occurring via network 1610.

A number of embodiments of the invention have been described. Nevertheless, it will be understood that various modifications may be made without departing from the spirit and scope of the invention.

Figure 15:
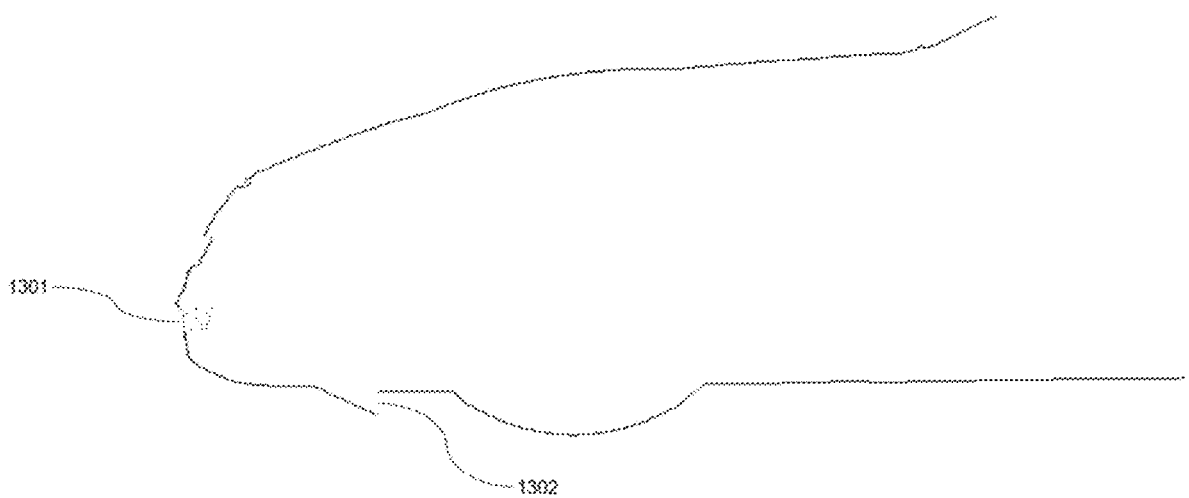
FIG. 15 shows areas of a modeled car where interior pixels and missing pixels are present.

For example, the systems and techniques disclosed herein are not limited to cars but also applicable to other vehicles such as trucks or heavy-duty tractors (and potentially other vehicle, objects, and/or environments). The process can be simplified, in some implementations, by removing the side view mirrors (or other external protruding objects) before taking the screenshots in step 403. The shapes or edges change rapidly around the mirror ranges which can, in some instances, pose challenges (e.g., in step 411) when converting geometry points to actual 2D meshes. The systems and processes disclosed herein tend to be robust enough to handle scenarios in which the created edge images of the vehicle are not perfect. For example, FIG. 15 shows two problematic areas 1301 and 1302 where interior pixels and missing pixels are present, respectively. An optimized circle dimeter was chosen when performing the constrained Delaunay triangulation in step 411.

Additionally, in some implementations, the systems and techniques disclosed herein can be integrated into automated simulation workflows to automatically create 3D digital geometries to define varied variable resolution (VR) meshing regions for simulating vehicles. In some implementations, the systems and techniques can be utilized to quickly create multiple vehicle models with varied external shape designs in order to perform fast-turnaround simulations at the early design stage.

The ray casting process is not limited to casting rays toward the image of the modeled object (e.g., car) from three directions. In some implementations, rays may be cast toward the modeled object from more than three, and in some instances significantly more than three different directions.

It should be understood that the example embodiments described herein may be implemented in many different ways. In some instances, the various methods and machines described herein may each be implemented by a physical, virtual, or hybrid general purpose computer, such as a computer system, or a computer network environment, such as those described herein. The computer/system may be transformed into the machines that execute the methods described herein, for example, by loading software instructions into either memory or non-volatile storage for execution by the CPU. One of ordinary skill in the art should understand that the computer/system and its various components may be configured to carry out any embodiments or combination of embodiments of the present invention described herein. Further, the system may implement the various embodiments described herein utilizing any combination of hardware, software, and firmware modules operatively coupled, internally, or externally, to or incorporated into the computer/system.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to be solely a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification can be implemented as operations performed by a data processing apparatus (e.g., a processor/specially programmed processor/computer) on data stored on one or more computer-readable storage devices or received from other sources, such as the computer system and/or network environment described herein. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Each component (e.g., mesh generators, geometry viewer, calculator, geo-pixel mapping component, etc.) mentioned herein may be implemented, for example, by one of more computer hardware components (e.g., one or more computer processors) executing computer readable instructions stored on computer-readable media (e.g., hardware memory in the form of RAM, ROM, etc.) to perform the associated computer-implemented functionalities described herein.

The systems and techniques disclosed herein may be utilized in connection with the overall design, analysis, and real-world manufacturing of an object (e.g., a car). Typically, the simulation processes disclosed herein may be utilized to analyze the performance or behavior of the modeled object (e.g., car) to confirm expectations or to guide further iterations in the design of the modeled car. Typically, the design and analysis/simulation will be followed by manufacturing a real-world version of the modeled object (e.g., car) based on a final design that has been exposed to computer-based simulations, prior to manufacturing, utilizing the systems and techniques disclosed herein. The final, manufactured real world version of the modeled object would be a physical thing (e.g., a car or the like). Thus, the invention provides an improvement to the domains of both design and manufacturing.

Other implementations are within the scope of the claims.

What is claimed is:

1. A computer-implemented method for creating three-dimensional (3D) variable resolution (VR) region geometries of a modeled object for use in a computer-implemented numerical simulation involving the modeled object, the computer-implemented method comprising:
generating two-dimensional (2D) orthographic views of a 3D modeled object that represents a visual real world appearance of the 3D modeled object;
identifying outer edges of each of the 2D orthographic views with a computer-based ray casting method to produce an outline of the outer edges for each respective one of the 2D orthographic views, wherein each one of the outlines is configured such that, if the outline were superimposed and aligned with the corresponding orthographic view, the outline would substantially align with the outer edges of the corresponding orthographic view, with no portion of the modeled object or any other modeled object extending substantially beyond the outline, wherein the computer-based ray casting method comprises, for each respective one of the 2D orthographic views:
casting virtual rays from different directions toward the 2D orthographic view within a plane of the 2D orthographic view; and
detecting an intersection point for each of the virtual rays with an edge of the 2D orthographic view.

2. The method of claim 1, further comprising:
calculating bounding box dimensions for the 3D modeled object, wherein the bounding box dimensions define a size of a smallest possible box that would completely contain the 3D modeled object.

3. The method of claim 2, wherein calculating the bounding box dimensions comprises:
defining a plurality of bounding box surfaces, wherein the plurality of bounding box surfaces comprises:
a front surface that contacts a frontmost point of the 3D modeled object;
a rear surface that contacts a rearmost point of the 3D modeled object;
side surfaces that respectively contact furthest points on either side of the 3D modeled object;
a bottom surface that contacts a lowest point of the 3D modeled object; and
a top surface that contacts a highest point on the 3D modeled object, and
wherein the front surface is parallel to the rear surface, the bottom surface is parallel to the top surface, and each of the side surfaces is parallel to the other side surface.

4. The method of claim 3, wherein the bounding box dimensions are calculated, by a computer processor, based on relative locations of the plurality of bounding box surfaces.

5. The method of claim 4, further comprising:
calculating, with a computer processor, a geo-pixel mapping ratio to represent a mapping relationship between pixels in one or more of the 2D orthographic views and a corresponding distance represented in the 3D modeled object.

6. The method of claim 5, wherein calculating the geo-pixel mapping ratio comprises:
calculating a distance in the 3D modeled object that corresponds to a space between adjacent pixels based on the bounding box dimensions and a number of pixels applied to that distance for each respective one of the 2D orthographic views.

7. The method of claim 6, further comprising:
converting a pixel list for one or more of the 2D orthographic views to a geometry point list based on the calculated geo-pixel mapping ratio,
wherein each entry in the geometry point list comprises a set of coordinate values that identifies a location on the 3D modeled object for an associated one of the listed geometry points.

8. The method of claim 7, wherein the 3D modeled object is a 3D modeled car that comprises tires and a hood, the method further comprising calculating a height of the hood of the 3D modeled car.

9. The method of claim 8, wherein calculating the hood height comprises:
sorting the geometry point list to identify two lowest geometry points in a vertical direction based on their respective coordinate values;
identifying a forwardmost one of the two lowest geometry points in the vertical direction based on their respective coordinate values to identify a coordinates value that corresponds to a lowest point of a front tire of the 3D modeled car;
casting a virtual ray from the lowest point of the front tire of the 3D modeled car in a vertically upward direction;
intersecting a point on the 3D modeled car vertically above the lowest point of the front tire of the 3D modeled car with the cast ray; and
identifying a length of the cast ray from the lowest point of the front tire to the point of intersection vertically above the lowest point of the front tire as a hood height for the 3D modeled car.

10. The method of claim 9, further comprising:
identifying a rearmost one of the two lowest geometry points in the vertical direction based on their respective coordinate values to identify a lowest point of a rear tire of the 3D modeled car.

11. The method of claim 10, further comprising:
translating and scaling the points from the geometry point list for each respective one of multiple views of the modeled car based on distance requirements, stored in computer memory, for each of the VR region geometries.

12. The method of claim 11, further comprising:
generating 2D surface meshes that correspond to each respective one of the 2D orthographic views.

13. The method of claim 12, wherein generating the 2D surface meshes comprises:
generating the 2D surface meshes with a 2D triangle mesh generator based on the translated and scaled points from the geometry point list for each respective one of the multiple views of the modeled car.

14. The method of claim 13, further comprising:
calculating bounding box dimensions of the 2D surface meshes.

15. The method of claim 12, further comprising:
constructing intermediate 3D meshes from the 2D surface meshes.

16. The method of claim 15, wherein constructing the intermediate 3D meshes from the 2D surface meshes comprises, for each of the 2D surface meshes:
orienting selected facets of the 2D surface mesh so that a negative side of all facets is facing toward an interior of the modeled car;
duplicating the 2D surface mesh to produce a duplicated 2D surface mesh; and
extruding the 2D surface mesh or the duplicated 2D surface mesh.

17. The method of claim 16, wherein each extrusion is performed in a direction normal to a surface of the 2D surface mesh or the duplicated 2D surface mesh to produce an extruded mesh and covers a distance that is based on dimensions of the VR region geometries.

18. The method of claim 15, further comprising:
intersecting the intermediate 3D meshes to produce a final 3D mesh having the 3D VR region geometry.

19. The method of claim 18, further comprising:
utilizing the final 3D mesh having the 3D VR geometry in a computer-implemented simulation to analyze performance or behavior of the 3D modeled car to confirm expectations and/or guide further iterations in design of the 3D modeled car.

20. The method of claim 19, further comprising:
manufacturing a real-world version of the 3D modeled car based on a final design that has been exposed to the computer-based simulation.

21. The method of claim 1, wherein the edges identified in each respective one of the 2D orthographic views form an external outline of an object represented in each respective one of the 2D orthographic views.

22. The method of claim 21, wherein the virtual rays originate from different origin points outside the 2D orthographic view.

23. The method of claim 21, wherein the intersection point detected for each respective one of the virtual rays is a first intersection point between that virtual ray and the edge of the 2D orthographic view, and
wherein each of the first intersection points represents a portion of the external outline of the associated one of the 2D orthographic views.

24. A computer system for creating three-dimensional (3D) variable resolution (VR) region geometries of a modeled object for use in a computer-implemented numerical simulation involving the modeled object, the computer system comprising:
a computer processor; and
computer-based memory operatively coupled to the computer processor, wherein the computer-based memory stores computer-readable instructions that, when executed by the computer processor, cause the computer-based system to:
generate two-dimensional (2D) orthographic views of a 3D modeled object that represent a visual real world appearance of the 3D modeled object;
identify outer edges of each of the 2D orthographic views with a computer-based ray casting method to produce an outline of the outer edges for each respective one of the 2D orthographic views, wherein each one of the outlines is configured such that, if the outline were superimposed and aligned with the corresponding orthographic view, the outline would substantially align with the outer edges of the corresponding orthographic view, with no portion of the modeled object or any other modeled object extending substantially beyond the outline, wherein the computer-based ray casting method comprises, for each respective one of the 2D orthographic views:
casting virtual rays from different directions toward the 2D orthographic view within a plane of the 2D orthographic view; and
detecting an intersection point for each of the virtual rays with an edge of the 2D orthographic view.

25. A computer-implemented method for creating three-dimensional (3D) variable resolution (VR) region geometries of a modeled object for use in a computer-implemented numerical simulation involving the modeled object, the computer-implemented method comprising:
generating two-dimensional (2D) orthographic views of a 3D modeled object;
identifying edges of each of the 2D orthographic views with a computer-based ray casting method, wherein the computer-based ray casting method comprises, for each respective one of the 2D orthographic views:
casting virtual rays from different directions toward the 2D orthographic view within a plane of the 2D orthographic view; and
detecting an intersection point for each of the virtual rays with an edge of the 2D orthographic view; and
calculating a geo-pixel mapping ratio by calculating a distance in the 3D modeled object that corresponds to a space between pixels in one or more of the 2D orthographic views based on bounding box dimensions for the 3D modeled object and a number of pixels applied to the distance for each respective one of the 2D orthographic views.

26. A method comprising:
creating three-dimensional (3D) variable resolution (VR) region geometries of a modeled object via a computer-implemented method comprising:
generating two-dimensional (2D) orthographic views of a 3D modeled object that represents a visual real world appearance of the 3D modeled object; and
identifying outer edges of each of the 2D orthographic views with a computer-based ray casting method to produce an outline of the outer edges for each respective one of the 2D orthographic views, wherein each one of the outlines is configured such that, if the outline were superimposed and aligned with the corresponding orthographic view, the outline would substantially align with the outer edges of the corresponding orthographic view, with no portion of the modeled object or any other modeled object extending substantially beyond the outline, wherein the computer-based ray casting method comprises, for each respective one of the 2D orthographic views:
casting virtual rays from different directions toward the 2D orthographic view within a plane of the 2D orthographic view; and
detecting an intersection point for each of the virtual rays with an edge of the 2D orthographic view.

27. A computer system comprising:
a computer processor; and
computer-based memory operatively coupled to the computer processor, wherein the computer-based memory stores computer-readable instructions that, when executed by the computer processor, cause the computer-based system to:
create three-dimensional (3D) variable resolution (VR) region geometries of a modeled object via a method comprising:
generating two-dimensional (2D) orthographic views of a 3D modeled object that represents a visual real world appearance of the 3D modeled object; and
identifying edges of each of the 2D orthographic views with a computer-based ray casting method to produce an outline of the outer edges for each respective one of the 2D orthographic views, wherein each one of the outlines is configured such that, if the outline were superimposed and aligned with the corresponding orthographic view, the outline would substantially align with the outer edges of the corresponding orthographic view, with no portion of the modeled object or any other modeled object extending substantially beyond the outline, wherein the computer-based ray casting method comprises, for each respective one of the 2D orthographic views:

casting virtual rays from different directions toward the 2D orthographic view within a plane of the 2D orthographic view; and detecting an intersection point for each of the virtual rays with an edge of the 2D orthographic view.

28. A computer-implemented method for creating three-dimensional (3D) variable resolution (VR) region geometries of a modeled object for use in a computer-implemented numerical simulation involving the modeled object, the computer-implemented method comprising:

generating two-dimensional (2D) orthographic views of a 3D modeled object;

identifying edges of each of the 2D orthographic views with a computer-based ray casting method, wherein the computer-based ray casting method comprises, for each respective one of the 2D orthographic views:

casting virtual rays from different directions toward the 2D orthographic view within a plane of the 2D orthograph view; and detecting an intersection point for each of the virtual rays with an edge of the 2D orthographic view;

calculating bounding box dimensions for the 3D modeled object, wherein the bounding box dimensions define a size of a smallest possible box that would completely contain the 3D modeled object, wherein calculating the bounding box dimensions comprises:

defining a plurality of bounding box surfaces, wherein the plurality of bounding box surfaces comprises:

a front surface that contacts a frontmost point of the 3D modeled object;

a rear surface that contacts a rearmost point of the 3D modeled object;

side surfaces that respectively contact furthest points on either side of the 3D modeled object;

a bottom surface that contacts a lowest point of the 3D modeled object; and a top surface that contacts a highest point on the 3D modeled object, and wherein the front surface is parallel to the rear surface, the bottom surface is parallel to the top surface, and each of the side surfaces is parallel to the other side surface, wherein the bounding box dimensions are calculated, by a computer processor, based on relative locations of the plurality of bounding box surfaces;

calculating, with a computer processor, a geo-pixel mapping ratio to represent a mapping relationship between pixels in one or more of the 2D orthographic views and a corresponding distance represented in the 3D modeled object, wherein calculating the geo-pixel mapping ratio comprises:

calculating a distance in the 3D modeled object that corresponds to a space between adjacent pixels based on the bounding box dimensions and a number of pixels applied to that distance for each respective one of the 2D orthographic views.

\* \* \* \* \*